US009699317B1

(12) United States Patent
Pycko et al.

(10) Patent No.: US 9,699,317 B1
(45) Date of Patent: *Jul. 4, 2017

(54) USING A SPEECH ANALYTICS SYSTEM TO CONTROL A SECURE AUDIO BRIDGE DURING A PAYMENT TRANSACTION

(71) Applicant: Noble Systems Corporation, Atlanta, GA (US)

(72) Inventors: Marcin Pycko, Dallas, TX (US); Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/157,472

(22) Filed: May 18, 2016

Related U.S. Application Data

(63) Continuation of application No. 14/172,993, filed on Feb. 5, 2014, now Pat. No. 9,407,758, which is a continuation-in-part of application No. 13/861,102, filed on Apr. 11, 2013, now Pat. No. 8,831,204, and a continuation-in-part of application No. 13/949,467, (Continued)

(51) Int. Cl.
*H04M 3/00* (2006.01)
*H04M 5/00* (2006.01)
*H04M 3/56* (2006.01)
*H04M 7/00* (2006.01)
*H04M 3/51* (2006.01)
*G06Q 20/16* (2012.01)
(Continued)

(52) U.S. Cl.
CPC .............. *H04M 3/56* (2013.01); *G06Q 20/16* (2013.01); *G10L 15/30* (2013.01); *H04M 3/16* (2013.01); *H04M 3/5166* (2013.01); *H04M 3/5183* (2013.01); *H04M 7/006* (2013.01); *H04M 2203/6009* (2013.01)

(58) Field of Classification Search
CPC .......................... H04M 3/5183; H04M 3/5166
USPC ....................................... 379/265.02, 265.09
See application file for complete search history.

(56) References Cited

U.S. PATENT DOCUMENTS 5,267,305 A  11/1993  Prohs et al.
5,270,920 A  12/1993  Pearse et al.
(Continued)

OTHER PUBLICATIONS

Office Action Received for U.S. Appl. No. 14/080,912 dated Apr. 8, 2016.
(Continued)

*Primary Examiner* — Nafiz E Hoque

(57) ABSTRACT

An architecture and process flow for a contact center that receives payments prevents the agent from hearing sensitive financial information during the payment transaction. During a call with a remote party, the agent determines an appropriate time to bridge on a bank card payment processing system to receive and process a payment. Audio of the call to the agent is then interrupted so as to avoid the agent hearing any sensitive financial information provided by the remote party. A speech analytics system ("SAS") is bridged onto the call and monitors the payment transaction. The SAS provides status indications displayed to the agent so that the agent is able to monitor the progression of the payment transaction without hearing the contents of the call. The SAS determines when the payment transaction has completed and causes the agent audio to be restored.

20 Claims, 13 Drawing Sheets

Related U.S. Application Data filed on Jul. 24, 2013, now Pat. No. 9,225,833, and a continuation-in-part of application No. 14/073,083, filed on Nov. 6, 2013, now Pat. No. 9,456,083, and a continuation-in-part of application No. 14/080,912, filed on Nov. 15, 2013.

(51) Int. Cl.
    *G10L 15/30* (2013.01)
    *H04M 3/16* (2006.01)

(56) References Cited

U.S. PATENT DOCUMENTS

| | | | |
|---|---|---|---|
| 6,157,808 A | 12/2000 | Hollingsworth | |
| 6,356,634 B1 | 3/2002 | Noble, Jr. | |
| 6,721,416 B1 | 4/2004 | Farrell | |
| 6,862,343 B1* | 3/2005 | Vacek | H04M 3/5166 |
| | | | 379/266.1 |
| 7,133,828 B2 | 11/2006 | Scarano et al. | |
| 7,542,902 B2 | 6/2009 | Scahill et al. | |
| 7,548,539 B2 | 6/2009 | Kouretas et al. | |
| 7,574,000 B2 | 8/2009 | Blair | |
| 7,672,845 B2 | 3/2010 | Beranek et al. | |
| 7,752,043 B2 | 7/2010 | Watson | |
| 7,930,179 B1 | 4/2011 | Gorin et al. | |
| 7,974,411 B2 | 7/2011 | Krishnapuram et al. | |
| 8,078,470 B2 | 12/2011 | Levanon | |
| 8,094,790 B2 | 1/2012 | Conway et al. | |
| 8,094,803 B2 | 1/2012 | Danson et al. | |
| 8,155,297 B1 | 4/2012 | Dhir et al. | |
| 8,175,007 B2 | 5/2012 | Jain et al. | |
| 8,180,643 B1 | 5/2012 | Pettay et al. | |
| 8,204,180 B1 | 6/2012 | Narayanan et al. | |
| 8,209,182 B2 | 6/2012 | Narayanan | |
| 8,219,401 B1 | 7/2012 | Pettay et al. | |
| 8,249,875 B2 | 8/2012 | Levanon et al. | |
| 8,275,115 B1* | 9/2012 | Everingham | H04M 3/5166 |
| | | | 379/265.01 |
| 8,396,205 B1 | 3/2013 | Lowry et al. | |
| 8,396,732 B1 | 3/2013 | Nies et al. | |
| 8,401,155 B1 | 3/2013 | Barnes et al. | |
| 8,422,641 B2 | 4/2013 | Martin, II | |
| 8,463,606 B2 | 6/2013 | Scott et al. | |
| 8,504,371 B1 | 8/2013 | Vacek et al. | |
| 8,531,501 B2 | 9/2013 | Portman et al. | |
| 8,649,499 B1 | 2/2014 | Koster et al. | |
| 8,761,376 B2 | 6/2014 | Pande et al. | |
| 8,767,948 B1 | 7/2014 | Riahi et al. | |
| 8,781,092 B2 | 7/2014 | Noble, Jr. | |
| 8,949,128 B2 | 2/2015 | Meyer et al. | |
| 9,014,364 B1 | 4/2015 | Koster et al. | |
| 2003/0002651 A1 | 1/2003 | Shires | |
| 2003/0154120 A1 | 8/2003 | Freishtat et al. | |
| 2004/0008828 A1 | 1/2004 | Coles et al. | |
| 2004/0249650 A1 | 12/2004 | Freedman et al. | |
| 2005/0238161 A1 | 10/2005 | Yacoub et al. | |
| 2005/0283475 A1 | 12/2005 | Beranek et al. | |
| 2005/0286705 A1 | 12/2005 | Contolini et al. | |
| 2005/0286706 A1 | 12/2005 | Fuller | |
| 2006/0050658 A1 | 3/2006 | Shaffer et al. | |
| 2006/0111953 A1 | 5/2006 | Setya | |
| 2006/0233346 A1 | 10/2006 | McIlwaine et al. | |
| 2006/0256954 A1 | 11/2006 | Patel et al. | |
| 2006/0259473 A1 | 11/2006 | Li et al. | |
| 2006/0262919 A1 | 11/2006 | Danson et al. | |
| 2006/0265090 A1 | 11/2006 | Conway et al. | |
| 2007/0088563 A1 | 4/2007 | Nardotti, Jr. et al. | |
| 2007/0111180 A1 | 5/2007 | Sperle et al. | |
| 2007/0160054 A1 | 7/2007 | Shaffer et al. | |
| 2007/0198330 A1 | 8/2007 | Korenblit et al. | |
| 2007/0280211 A1 | 12/2007 | Malueg et al. | |
| 2007/0280460 A1 | 12/2007 | Harris et al. | |
| 2008/0002823 A1 | 1/2008 | Fama et al. | |
| 2008/0027785 A1 | 1/2008 | Mechaley et al. | |
| 2008/0037719 A1 | 2/2008 | Doren | |
| 2008/0082330 A1 | 4/2008 | Blair | |
| 2008/0240376 A1 | 10/2008 | Conway et al. | |
| 2008/0270123 A1 | 10/2008 | Levanon et al. | |
| 2009/0157449 A1 | 6/2009 | Itani et al. | |
| 2009/0295536 A1 | 12/2009 | Doren | |
| 2010/0036670 A1 | 2/2010 | Hill et al. | |
| 2010/0082342 A1 | 4/2010 | Erhart et al. | |
| 2010/0104086 A1 | 4/2010 | Park | |
| 2010/0138411 A1 | 6/2010 | Judy et al. | |
| 2010/0158237 A1 | 6/2010 | McCormack et al. | |
| 2010/0161990 A1 | 6/2010 | Statham et al. | |
| 2011/0010173 A1 | 1/2011 | Scott et al. | |
| 2011/0026688 A1 | 2/2011 | Simpson | |
| 2011/0033036 A1 | 2/2011 | Edwards et al. | |
| 2011/0125499 A1 | 5/2011 | Griggs et al. | |
| 2011/0145093 A1 | 6/2011 | Paradise et al. | |
| 2011/0202344 A1 | 8/2011 | Meyer et al. | |
| 2011/0218798 A1 | 9/2011 | Gavalda | |
| 2011/0228919 A1 | 9/2011 | Tew et al. | |
| 2011/0307258 A1 | 12/2011 | Liberman et al. | |
| 2011/0317828 A1 | 12/2011 | Corfield | |
| 2012/0045043 A1 | 2/2012 | Timpson | |
| 2012/0140911 A1 | 6/2012 | Johansen et al. | |
| 2012/0263285 A1 | 10/2012 | Rajakumar et al. | |
| 2013/0003943 A1 | 1/2013 | Munns et al. | |
| 2013/0129069 A1* | 5/2013 | Peterson | H04M 3/5141 |
| | | | 379/265.02 |
| 2013/0246053 A1 | 9/2013 | Scott et al. | |
| 2014/0100848 A1 | 4/2014 | Shaffer et al. | |
| 2014/0140496 A1 | 5/2014 | Ripa et al. | |
| 2014/0140497 A1 | 5/2014 | Ripa et al. | |
| 2014/0163960 A1 | 6/2014 | Dimitriadis et al. | |
| 2014/0241519 A1 | 8/2014 | Watson et al. | |
| 2014/0257820 A1 | 9/2014 | Laperdon et al. | |
| 2014/0379525 A1 | 12/2014 | Timem et al. | |
| 2015/0106091 A1 | 4/2015 | Wetjen et al. | |
| 2015/0281446 A1 | 10/2015 | Milstein et al. | |

OTHER PUBLICATIONS

Office Action Received for U.S. Appl. No. 14/743,200 dated Aug. 10, 2016.
Office Action Received for U.S. Appl. No. 15/239,260 dated Jan. 27, 2017.
Notice of Allowance Received for U.S. Appl. No. 13/968,692 dated Nov. 15, 2016.
U.S. Appl. No. 61/753,641, filed Jan. 2013, Watson et al.
Office Action Received for U.S. Appl. No. 15/231,154 dated Feb. 10, 2017.
Office Action Received for U.S. Appl. No. 14/080,912 dated Feb. 10, 2017.
Office Action Received for U.S. Appl. No. 15/051,930 dated Nov. 10, 2016.
Office Action Received for U.S. Appl. No. 14/183,083 dated Oct. 7, 2016.
Notice of Allowance Received for U.S. Appl. No. 14/743,200 dated Nov. 10, 2016.
Notice of Allowance Received for U.S. Appl. No. 15/081,358 dated Jul. 27, 2016.

* cited by examiner

USING A SPEECH ANALYTICS SYSTEM TO CONTROL A SECURE AUDIO BRIDGE DURING A PAYMENT TRANSACTION

CROSS REFERENCE TO RELATED PATENT APPLICATIONS

This application is a continuation of U.S. patent application Ser. No. 14/172,993, now U.S. Pat. No. 9,407,758, filed on Feb. 5, 2014, entitled "Using a Speech Analytics System to Control a Secure Audio bridge During a Payment Transaction," which is a continuation-in-part of U.S. patent application Ser. No. 14/080,912, entitled "Architecture for Processing Real Time Event Notifications From A Speech Analytics System," filed on Nov. 15, 2013, a continuation-in-part of U.S. patent application Ser. No. 14/073,083, now U.S. Pat. No. 9,456,083, entitled "Configuring Contact Center Components for Real Time Speech Analytics," filed on Nov. 6, 2013, a continuation-in-part of U.S. patent application Ser. No. 13/949,467, now U.S. Pat. No. 9,225,833, entitled "Management System for Using Speech Analytics to Enhance Contact Center Agent Conformance," filed on Jul. 24, 2013, and a continuation-in-part of U.S. patent application Ser. No. 13/861,102, now U.S. Pat. No. 8,831,204, entitled "Protecting Sensitive Information Provided By a Party to a Contact Center," filed on Apr. 11, 2013, the contents of all of which are incorporated by reference for all that they teach.

BACKGROUND

Contact centers frequently handle calls where a party makes a payment for a service or good. This may be, for example, in conjunction with an incoming call where the remote party pays for a service, or in conjunction with an outbound call where the remote party purchases a good. Quite often, the payments occur using a bank card of some form, such as a credit card, which facilitates consumers desiring to make payments over the phone. A very extensive and developed infrastructure exists for processing credit card payments, and consumers are accustomed to doing so over the phone.

Maintaining security of bank card numbers is vitally important, and the need for this is highlighted by frequent news reports of identity theft. One approach for accomplishing a credit card payment over the phone involves the remote party verbally indicating to a salesperson the type of credit card, the credit card number, expiration date, and a security code. This approach of verbally indicating this information to a salesperson carries risks, as the information may be written down by the salesperson for later entry and the information may be subsequently compromised. For example, the information may be written down on a piece of paper and later discarded, and only later discovered the information was compromised and used for nefarious purposes. Many businesses structure their internal credit card payment systems so that a salesperson is not directly involved in entering or transcribing the bank card information.

One approach for avoiding contact center employees exposure to a customer's bank card information is to establish a conference call with an automated interactive voice response ("IVR") system that processes bank card information. This is referred to herein as a Bank Card Payment Processing System ("BCPPS" or "BCPP system"). The BCPPS prompts the remote party for bank card payment information and receives responses, such as in the form of dual tone multiple frequency ("DTMF") tones entered by the party. However, if the agent is on the conference call, the agent still hears the DTMF information entered by the party. It is possible that unauthorized personal may use recording devices to record the tones, which can then be later decoded to provide the credit card information. Further, some IVRs employ speech recognition so that the customer may speak the digits to the BCPPS, as opposed to providing DTMF. This makes it even easier for the information to be compromised should the agent hear this.

Various approaches have been designed for muting the agent's audio during this process, but the process is complicated by defining an approach that easily functions with different types of IVRs, such as third-party operated IVRs. Thus, improved and simplified approaches are needed for controlling the agent's audio path when a remote party interacts with a BCPPS for purposes of paying by a bank card.

BRIEF SUMMARY

In general, various embodiments disclosed herein involve the use of a speech analytics system to control the audio path to an agent during a call when payment from a remote party occurs using a bank card. In one embodiment, the agent determines when a bank card payment transaction should begin. In response, the agent may invoke a function which bridges on a speech analytics system and a BCPPS using a secure conference bridge. The secure conference bridge interrupts the agent from hearing any audio. The speech analytics system further monitors the remote party interaction with the BCPPS to determine when the bank card transaction has been completed. When completed, the speech analytics systems restores the audio to the agent. Further, the speech analytics system may also generate status indicators of the payment transaction in progress, which are displayed to the agent. This allows the agent to monitor the progress of the payment transaction even though the agent cannot hear any sensitive financial information. Other embodiments are disclosed that can be employed to achieve the same goal of the agent not hearing sensitive payment information.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
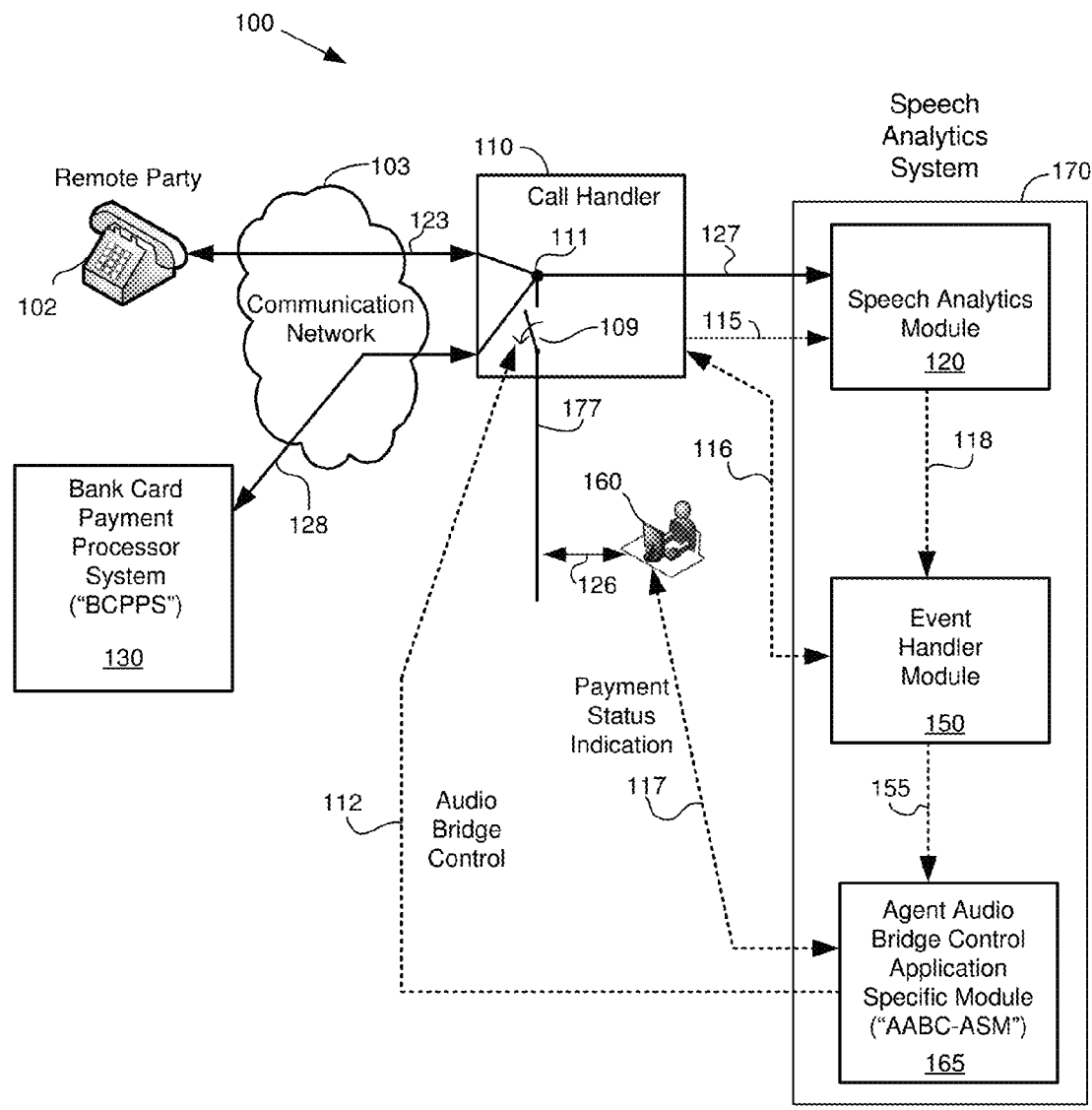
FIG. 1 illustrates an architecture of one embodiment of a contact center wherein a speech analytics system is used to control a secure multi-port audio bridge associated with an agent during a payment transaction between a remote party and a BCPPS.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Additional background information regarding the operation of the contact center with respect to a speech analytics system is provided in further detail in the disclosure of the above mentioned patent applications. This background information describes various components that may be present in a contact center, how event notifications from the speech analytics system are generally processed, and how application specific modules may process event notifications for specific calls to implement specific capabilities or applications. The description of the overall framework is not repeated herein, but incorporated by reference to provide additional information for using speech analytics for controlling an audio bridge associated with the agent, particularly with respect to processing a payment from the remote party.

Although the examples provided herein illustrate the concepts by a contact center receiving a call answered by a called party, the concepts could apply to other types of calls, including outgoing calls from a contact center. Furthermore, although the principles are illustrated using a credit card for making a payment, the principles can be used for a variety of other financial instruments or bank cards, including, by not limited to, debit cards, gift cards, automatic teller machine cards, charge cards, etc. Furthermore, although the examples illustrate the use of a bank card for making a payment, the principles can apply to other applications where sensitive information is verbally provided by a remote party and processed via an automated voice response system, such as health care information, general financial information, or other forms of confidential information.

Voice calls (or simply "calls") that are directed to a contact center, or which originate from the contact center, frequently may involve processing a payment from the remote party. The term "remote party" refers to the party interacting with the contact center or BCPPS, regardless of whether the call is an incoming or outgoing call relative to the contact center. The purpose of the payment may vary, and may encompass the purchasing of goods or services, repayment of a loan installment, etc. Other purposes may include initiating a payment for the purpose of covering ancillary costs, fees, or taxes associated with a purchase, or to receive a refund to a bank card. It could even apply to a system that verifies the identity of the remote party by voice biometrics. It can apply to a variety of situations where sensitive information, particularly sensitive financial information, is provided by the remote party to an automated system in conjunction with a call to an agent in a contact center.

Typically, the remote party makes payments over the telephone using a bank card, such as a credit card, debit card, or by providing other forms of payment information, such as bank routing numbers. For purposes of illustrating the principles of the invention, operation is described in conjunction with a credit card, but the principles equally apply to using debit cards, automatic teller machine cards, charge cards, gift cards, or similar instruments. For purposes herein, a "bank card" includes any one of these types of cards, or similar types of payment cards, regardless of whether issued by a bank or branded by a bank.

Typically, the remote party making payment using a bank card recites information associated with the card. This may involve providing information regarding the type of bank card, bank card number, name of the party indicated on the card, expiration date, personal identification account ("PIN") number, or other related information as may be required. The information required to be provided by the remote party to effect a payment transaction using the bank card is referred to as "sensitive financial information" ("SFI") and may comprise numerical information or other alpha-numeric information. For example, for a credit card the party is typically required to indicate the type of card (e.g., MasterCard®, Visa®, etc.), the account number, the expiration date, the name on the card, and a security code number. In some cases, additional information such as billing address may be required. For other types of cards, different information may be required.

It is preferred that the agent does not have access to the audio (e.g., speech) generated by the remote party when providing the sensitive financial information. To avoid the agent from being exposed to such SFI on each call, companies may store credit card information in a computer file, so that it can be readily charged without the agent receiving it from the remote party. However, in many instances, the caller may be a first time caller or customer, and the information may be "on file." Second of all, many companies realize that retaining such sensitive financial information is a liability, as it may be "hacked." Hence, many companies structure their systems so that the remote party must re-enter the SFI each time a payment is made.

Another way to avoid the agent from hearing the sensitive financial information is to bridge into the call a BCPPS. This may be a specially configured IVR which that provides prompts, collects the required bank card information from the caller's responses, and processes the payment. In various embodiments, the BCPPS may collect responses in the form of dual-tone multiple frequency ("DTMF") digits (a.k.a. Touch Tones®) or via speech. In the latter instance, a speech recognition capability in the BCPPS recognizes various keywords, such as the type of card, numerical digits, and dates.

However, when bridging in a call to a BCPPS, thereby creating a conference call, the agent can still hear the sensitive information. If the SFI is provided via speech, then the agent can clearly comprehend the SFI. If DTMF digits are provided, then an audio recording can capture the tones for later decoding. It is even reported that some individuals are proficient at recognizing which digit a DTMF tone corresponds to and can mentally decode the audio information. Many companies seek to remove the agent from the call for the duration of the payment transaction, as it serves to further guarantee that the agent could not be a potential source of any security breach. Further, some companies further outsource the payment processing by using a third-party BCPPS so that the company does not have to further maintain security for such a device.

In an architecture where a business outsources this function by accessing a remote BCPPS, it may be difficult to interrupt the agent from hearing the audio of the payment transaction. This requires functionality in the contact center, to separate the caller from the BCPPS. One approach is for control to be transferred to the BCPPS and rely on it signaling the contact center indicating when the payment transaction is done so that the audio can be restored to the agent. However, this signaling and associated procedures may be difficult to coordinate when one or more BCPPS may be used, more so when a third party BCPPS is used. Thus, having a way to accurately detect in the contact center when the payment transaction has started and ended is preferable.

It is possible that the agent is allowed to hear the prompts of the BCPPS, but cannot hear the remote party's responses during the payment transaction. This prevents the agent from being exposed to SFI provided by the agent. This allows the agent to monitor the progress of the payment transaction to a degree, without being privy to SFI. However, many BCPPS confirm the information received to the remote party, so that allowing the agent to hear confirmatory information from the BCPPS defeats the purpose of keeping SFI private. In this situation, audio from both the remote party and the BCPPS should be isolated from the agent.

Using a speech analytics system allows the agent to be interrupted or isolated from the audio of both the BCCPS and the remote party for the duration of the payment transaction. The speech analytics system ("SAS") can be used to monitor the payment transaction between the remote party and the BCPPS and provide visual indications to the agent's workstation regarding the progress of the payment transaction, even though the agent cannot hear any of the audio. This is accomplished by the SAS monitoring for the presence of certain keywords or phrases used during the payment transaction and then mapping these to various status indications associated with the transaction. The status indicators are reported in real time to the agent. For example, upon detecting a prompt from the BCPPS for entering card account numbers and the remote party's response, the SAS can report to the agent that the card number digits have been entered by the remote party.

The SAS comprises a speech analytics module ("SAM") that is configured to detect certain keywords (these keywords encompass phrases as well, and logical constructs comprising multiple words in proximity to each other). Upon detecting a keyword, the SAM may generate "event notifications" that may indicate the keyword detected. The event notifications are provided by the SAM to an event handler module, which in turn may provide the event notifications to an application specific module ("ASM"). An ASM is a software module which is configured for a particular application (hence, it is application specific). The ASM in this case controls the agent's audio bridge for the current call, and thus is referred to as the Agent Audio Bridge Control ("AABC") ASM or "AABC-ASM". In various embodiments, the AABC-ASM may issue appropriate control messages to the agent multi-port secure audio bridge when the payment transaction begins and/or ends. Further, the AABC-ASM may provide appropriate status indications to a computer workstation used by the agent, so that the agent is informed about the status of the payment transaction, even though the agent cannot hear any audio during the payment transaction.

Presumably, the agent is conversing with the remote party after the call is connected and subsequently ascertains the need for a payment transaction. The agent may verbally inform the remote party that the agent is about to bridge on a BCPPS onto a call, and may inform the remote party that the agent will not be able to hear the information conveyed, but will available to converse with the remote party when the transaction completes. In one embodiment, the agent initiates the payment transaction. In other embodiments, the speech analytics system detects when the payment transaction is to begin and initiates the payment transaction. "Initiating" the payment transaction means a function is involved that causes the BCPPS to be bridged onto the call and the audio to the agent is interrupted, at which point the BCPPS can prompt the remote party for payment information. In some embodiments, the SAS is also bridged onto the call, if not already. In other embodiments, the mere bridging of the BCPPS onto the call may automatically cause the audio to the agent to be interrupted, whereas in other embodiments, a separate action is required to interrupt agent audio. These steps could all be performed manually in sequence, but it is preferable that they be performed automatically upon initiating the payment transaction.

Once the agent audio is interrupted, the agent cannot then determine when the payment transaction is completed. The SAS, however, is bridged onto the call by this point and can detect the end of the payment transaction. In one embodiment, the SAS monitors the audio from the BCPPS and once the payment is determined to have been completed, the agent's audio is restored so that the agent can hear the remote party's speech. The determination by the SAS when the payment transaction is completed can be facilitated by relying on certain phrases utilized by the BCPPS. For example, after successfully processing a credit card transaction, the BCPPS may respond to the remote party by stating: "Thank you. Your payment has been processed." Thus, the SAS can trigger off of this phrase with relative accuracy to determine the end of the payment transaction. At this point, the SAS, specifically the AABC-ASM, can indicate to the agent that the transaction is completed and the SAS or the agent can cause the BCPPS to be dropped from the call. In order for the agent to not hear any SFI, the resumption of the audio to the agent should only occur when the payment processing is complete, and not during the payment transaction.

As can be imagined, it is possible that the BCPPS may not properly detect the end of the payment transaction and restore the audio to the agent. There may be, for example, background noise associated with the remote caller that may interfere with the speech processing. It is unlikely that any background noise would originate from the BCPPS. Or, the BCPPS may have altered its announcements, which may result in the SAS not detecting certain expected keywords.

In such cases, the SAS may report difficulties to the agent. In one embodiment, a "watchdog" timer may detect an unusually long interaction which suggests some form of issue. In such cases, either the agent or the SAS can then drop the BCPPS and restore the audio to the agent, whence the agent can address the difficulty with the remote party. This is referred to as a manual recovery action. Manual recovery actions may be recorded, or reported, as this may be symptomatic of a system error or incorrect operation by the agent.

As it will be seen, there are various levels of automation that can occur in this process, and various associated functions can be accomplished in different ways. For example, the SAS could detect when the payment transaction is to begin and automatically cause the BCPPS to be bridged in and interrupt the agent's audio. In other embodiments, the agent may ascertain when the payment transaction should begin, and cause the BCPPS to be bridged in. Further, in various embodiments, the SAS may be bridged onto the call at the call's beginning for other reasons, or may only be bridged on when the payment transaction starts.

Call Center Architecture

Turning to FIG. 1, a high level architecture 100 of one embodiment of the relevant components involved is shown. The architecture 100 shows a remote party represented by a conventional telephone 102, although any number of devices and technologies may be used by the remote party. The remote party may be a calling party or a called party relative to the contact center that converses with the agent on a call leg 123. For purpose of illustration, and not for limitation, the examples herein focus on the contact center receiving the call from the remote party, although it should be readily apparent that the principles can equally apply to calls originated by the contact center. Although the remote party is shown as using a conventional telephone and the communication network 103 may be a telephone network, other networks and communications technologies may be employed, such as Voice over IP ("VoIP"), cable networks, mobile networks, etc.

The remote party originates a call that is routed by the communication network 103 and received by a call handler 110. The call handler 110 may be one of any number of various devices used for processing calls in a contact center, including but not limited to: automatic call distributors ("ACDs"), interactive voice response units ("IVRs"), dialers, predictive dialers, private branch exchanges ("PBXs"), etc.

The call handler may connect the remote party to an agent. The agent may utilize a computer 160, which may be part of a workstation that may also include a voice device (i.e., phone), such as a headset, telephone, or a so-called soft-phone integrated into the computer 160. FIG. 1 does not explicitly show a voice processing device, but one may be assumed to be present. A local area network ("LAN") 177 may be used to transfer voice and/or data to the agent's workstation and communicate with other components and over one or more links 126 to the agent's computer. In other embodiments, separate facilities may be used for data transfer to the agent's computer and for the transfer of voice communication to the agent's phone. The exact technology and configuration of the agent's workstation is not relevant, as long as there is a voice connection between the agent and the remote party. There may be a number of other configurations involved with respect to connecting the remote party and the agent, but this does not alter the principles of the concepts disclosed herein.

Once the remote party is connected to the agent, the call handler 110 does not necessarily involve the use of a secure audio or conference bridge 111. If one is present, then the switch 109 (shown as open) is in a closed position. In other words, there is initially a direct connection between the remote party and the agent's voice device. Presumably, there is an ongoing verbal interaction between the remote party and the agent. At some point during the conversation, the agent may determine that the remote party is ready to make a payment, i.e., that a payment transaction is to occur. At this point, the agent may invoke a function via the computer 160 that causes the call handler to bridge on the BCPPS 130 and the SAS 170 (if not already bridged onto the call). In some embodiments, the SAS 170 may be automatically bridged onto the call when it is received, as the SAS may be used for other purposes in addition to controlling the secure audio bridge 111. For purposes of reference, this function is referred to as the "initiate payment transaction" function. Although described above as being invoked by the agent, it could be in some embodiments, invoked by the SAS.

Also shown in FIG. 1 is the SAS 170. In one embodiment, the SAS comprises a speech analytics module ("SAM") 120, an event handler module ("EHM") 150, and an Agent Audio Control Application Specific Module ("AABC-ASM") 165. These modules cooperate so as to monitor the speech present during a payment transaction, report the status of the payment transaction to the agent while the agent is unable to hear the audio, and when the payment transaction is completed, restore the audio to the agent. More will be said below as to how these modules cooperate to accomplish this.

Each of these modules 120, 150, 165 may be a software module comprising a set of computer instructions that are executing in separate hardware processing systems, or in a single common hardware system. Other variations are possible. In some embodiments, the event handler module 150 and the AABC-ASM 165 are integrated into one module, while other embodiments may integrate the SAM 120 and the event handler module 150. It is also possible for some of the modules to be offered as a service by a service provider, or implemented in a premised-based solution for a contact center.

For example, in one embodiment, the call handler may be offered as a premise-based or a hosted service (e.g., in the "cloud"), and bridges on the SAS 170, which is also offered as a hosted service. The call handler and the SAS may be remotely located from each other and operated and controlled by different entities. However, all the agent computers may be co-located in a single physical location, which comprises the "premised based" call center portion. In other embodiments, the agent computers may be dispersed. Similarly, the BCPPS 130 may be a hosted service, or co-located with the other system components. In this figure, the BCPPS 130 is accessed remotely, as it is operated by a third party. However, the concepts and principles herein apply equally to a premised based configuration where the BCPPS is local to the SAS. To clarify the inventive concepts, the description is based on describing various functions in terms of modules and their interaction with each other, recognizing that these modules may be deployed in various physical components at different locations.

Also, for purpose of illustration, in one embodiment, the SAM 120 is only bridged onto the call once it is determined a payment transaction should occur. That is, the SAM is not automatically bridged onto the call when initially received. However, there may be other reasons why the SAM is automatically bridged onto the call for purposes of monitoring the call, and those are described in U.S. patent application Ser. No. 13/949,476, entitled "Management System for Using Speech Analytics to Enhance Contact Center Agent Conformance," filed on Jul. 24, 2013, the contents of which are incorporate by reference. Rather, in the embodiment shown, the call handler 110 is configured to bridge on the SAM 120 to the call between the agent and the remote party when the initiated payment transaction function is invoked. In this case, the agent invokes the initiate payment transaction function.

For the SAS to monitor the speech between the remote party and the BCPPS during the payment transaction, a secure audio or conference bridge (or "bridge") is used. In this embodiment, the secure conference bridge 111 is shown as inside the call handler. As is well known, a conference bridge allows three or more parties to participate in a common call. Each portion of the call to a party is referred to as a call leg. A conference bridge typically supports three or more call legs. In this embodiment, a secure four-port conference bridge is used. It is secure because it is able to selectively isolate the agent from hearing SFI.

The secure audio bridge comprises one call leg that goes to the remote party, a second call leg that goes to the agent, a third call leg that goes to the BCPPS, and a fourth leg that goes to the SAS. From the perspective of the two endpoints associated with a call leg in a conference call, the call leg may be indistinguishable from a conventional call. Thus, a call leg involving two entities may be referenced herein as a call or as a call leg. Typically, a conference call is created by joining a conference call leg to an existing call. Thus, the description of a call between two entities does not preclude (or necessarily imply) the presence of a conference call.

Use of the term "call leg" does not imply a particular form of technology. Nor does the use of that term imply any particular physical structure of the call leg. The call leg may represent a virtual circuit, audio stream, link or other construct representing audio. Further, the reference to a conference bridge does not imply any particular form to technology, e.g., an analog bridge, digital bridge, etc.

The call legs can be accomplished in a number of ways, and again it is possible to use a number of different technologies. It is possible that one call leg along its portion may use one technology, and another call leg to use another technology. For example, the call leg to the remote party may be converted to an analog phone line with analog voice transmission to accommodate a conventional telephone, whereas the call leg to the SAS may be based on Voice over IP ("VoIP") technology.

For purposes of illustration, in certain embodiments, although a single call leg is described as being established, that call leg may involve multiple virtual connections or audio streams. For example, the call leg from the call handler 110 to the SAM 120 may involve establishing multiple Voice over IP ("VoIP") streams or virtual connections to the SAM. For simplicity, FIG. 1 shows a single line 127 associated with secure audio bridge 111, but the single line 127 can represent multiple VoIP streams associated with the conference call. There could be multiple VoIP streams received by the SAM in conjunction with the call leg to allow the SAM to separately analyze speech from the remote party, and the agent/BCPPS. This could be accomplished by using two separate VoIP streams. Use of a single stream to convey audio from multiple parties is possible, but doing so does not allow ready identification of which party is uttering which audio. When multiple voice streams are used, they may be conveyed using one circuit, facility, or trunk. Thus, the use of multiple voice streams does not require the use of multiple physical resources.

However, for many other applications involving speech analytics, only two separate VoIP streams are established— one for the agent and one for the remote party, which is described further in the above identified patent application, U.S. patent application Ser. No. 14/073,083. It may be advantageous to utilize this same architecture that uses dual streams for the present invention even though there are three distinct entities involved. If so, then one VoIP stream (referred to a VoIP Stream #1 for convenience) conveys audio from the remote party only, and the other VoIP Stream (referred to as VoIP Stream #2) conveys combined audio from the agent and/or the BCPPS. Since the agent may be interrupted from the call during the payment transaction (including audio from the agent), VoIP Stream #2 would only convey the BCPPS audio during the payment transaction. Before or after the payment transaction, VoIP Stream #2 would convey the agent audio, but not the BCPPS audio, since the BCPPS is not bridged on the call. Thus, the SAM 120 knows that VoIP Stream #1 is the remote party's audio, and VoIP Stream #2 is the other entity (agent or BCPPS) that is interacting with the remote party. Furthermore, if the SAM knows when the initiate payment transaction function is invoked (indicating the payment transaction process has begun), then the SAM knows that VoIP Stream #2 conveys BCPPS audio because the agent audio is interrupted during the payment transaction. Once the payment transaction is terminated and the BCPPS is dropped from the call and the agent audio is restored, then the SAM knows that VoIP Stream #2 now conveys agent audio. In the embodiment where the agent is only interrupted from hearing audio of the call, but not prevented from providing audio to the call, then presumably the agent would be silent during the payment transaction.

A signaling link 115 between the call handler 110 and the SAM 120 provides the appropriate signaling information necessary to establish and terminate the VoIP signaling streams 127 and indicate the necessary information, including when the initiate payment transfer function is invoked. However, in other embodiments, the signaling link 116 may also exist and may be used to convey such signaling information instead or in addition to the link 115. In FIG. 1, signaling or control data is generally shown as a dotted line and voice data is shown as a solid line. Use of the word "link" does not imply any particular logical or physical communication structure or protocol that is used.

As previously indicated, the SAS 170 comprises the SAM 120, event handler module 150, and the AABC-ASM 165, which cooperate together to control the secure audio bridge 111 and provide status notifications to the computer 160. A primary function of the SAM 120 is to listen to the speech of the call and provide suitable event notifications to the event handler module 150. In one embodiment, the SAM can be configured to listen to the speech from either the remote party, the agent/BCPPS, or both. In one embodiment, two VoIP streams are used for the call leg, so that the SAM can readily detect the remote party's speech and speech from the agent/BCPPS.

The SAM is typically configured to identify speech from the BCPPS indicating when the payment transaction is completed. Detecting when the payment transaction is completed can be done by ascertaining the presence of certain prompts from the BCPPS. In other embodiments, the BCPPS may self-disconnect when completing a payment transaction. In this case, the SAM may not detect the end of the transaction and bridge on the agent, however, the call handler may detect the BCPPS dropping off an automatically restore the agent's audio.

The SAM can also optionally detect when the payment transaction is to begin, which can be detected by ascertaining certain speech from the agent and invoke the initiate payment transaction function. However, in other embodiments, the agent ascertains when it is appropriate to begin a payment transaction and invokes the initiate payment transaction function. This function may further cause a signaling message to be communicated over signaling link 117, 116, or 115 so that the SAS and agent are informed when the payment transaction begins.

The SAM 120 generates event notifications, which are received by the event handler module 150. Event notifications are messages that indicate information about a call or about speech detected on the call. The former event notification messages are referred to as "call-related event notification messages" or simply "call-related event notifications" and these indicate the establishment or termination of a call leg to the SAM. The latter event notifications are referred to as "speech-related event notification messages" or simply "speech-related event notifications" and these indicate detection of a keyword in the speech of a particular call. For simplicity, the "messages" qualifier may not be used in all instances herein.

The speech-related event notification messages originate from the SAM 120 and are transmitted to the event handler module as depicted by link 118. For example, if the agent asks "Would you like to pay by credit card?" and the remote party answers "Yes", then the SAM can report such speech occurrences to the event handler module 150. The event handler module ensures that the correct ASM receives the appropriate event notifications. There may be a variety of application specific modules executing for various purposes. Further, there may be multiple simultaneous calls handled by the same ASM. The event handler also ensures that the proper contextual information is provided to the ASM, such as which call the speech-related event notification relates to, which party (e.g., the agent or remote party) spoke the keyword, and of course, which keyword was detected.

In contrast to speech-related event notifications, there are typically two call-related event notifications associated with a given call that are conveyed to the event handler module. The first is an indication that the call has been established and the other is that the call has been terminated.

Because the speech-related event notifications are directly related to detecting keywords during a call, and because the speech-related event notification references a particular call, receiving a speech-related event notification requires that a corresponding call-related event notification was previously generated.

In many contexts discussed herein, reference to an "event notification" for a call implicitly refers to a speech-related event notification for that call. Usually, the context in which the phrase is used will indicate whether the term "event notification" includes both types or just refers to the speech-related type of event notification. Furthermore, because each call is initiated and terminated, a corresponding call-related event notification indicating the beginning and end of the call is normally generated. The procedures for handling call-related event notifications are relatively straightforward as related to speech-related event notifications. Generally, each call has two call-related event notifications, but during a given call, there may none, one, or many speech-related event notifications sent to the event handler. Further, the various speech-related event notifications that are generated during a particular call may be direct for different ASMs.

The call handler 110 provides information to the SAM 120 regarding call legs established and terminated between agents and remote parties, via the signaling link 115. In some embodiments, the SAM may provide the call-related event notification messages to the event handler module using link 118. In other embodiments, the call handler may provide call-related event notification messages to the event handler module using link 116. In either embodiment, the event handler module receives the call-related event notification messages and is aware of the existence and termination of calls.

At a high level, the purpose of the event handler module is to route the event notification messages to the appropriate ASM. There may be a number of different types of ASMs defined, which may require receiving event notification messages. In one embodiment, the event handler module is configured to route a copy of each call-related event notification messages to each ASM, and route a copy of each speech-related event notification message to the appropriate ASMs. This may involve routing the speech-related event notification message to each ASM, or selectively routing the speech-related event notification to only certain ASMs. For example, if there are multiple ASMs used for different purposes, then the event handler ensures the proper ASMs receive the appropriate event notifications via link 155. Further information as to the reasoning and details of this operation can be found in the aforementioned patent applications that are incorporated by reference.

For example, one function provided by the AABC-ASM is to detect when the payment transaction has ended and restore the agent audio to the call. This can be referred to as invoking an "end payment transaction" function in the call handler. If there is no payment transaction occurring, then there is no need for the AABC-ASM to detect when the end of the payment transaction occurs. Thus, in one embodiment, the AABS-ASM may be configured to only expect and process speech-related event notifications once the agent has invoked the initiate payment transaction function. Since the event handler module directs the event notifications to the appropriate ASM, then in one embodiment, the event handle module will only direct speech-related event notifications for a given call to the AABS-ASM if the payment transaction has begun for that call. Of course, there may be multiple calls being processed by the ASM, and other calls may have started the payment transaction process.

To recap, the event-handler module 150 receives event notifications, which may be either call-related or speech related. The call-related event notifications may be received from the SAM on link 118 or from the call handler on link 116. The speech-related event notifications are typically received from the SAM 120 on link 118. The event handler module informs the appropriate ASMs of the event notifications using link 155.

In one embodiment, after the agent and remote party are communicating, the agent may ask the remote party whether they would like to initiate a payment. In response to the remote party confirming they would, the agent may invoke a function indicating initiation of the payment transaction process. This may be accomplished by using the agent's computer, which communicates the request to the call handler. This causes a call leg (which may comprise multiple VoIP streams) to be established from the bridge 111 to the SAM 120 as well as a call leg 128 from the secure audio bridge 111 to the BCPPS 130. Further, a signaling indication may be provided to the SAM 120, event handler module 150, and/or AABC-ASM 165 indicating that the payment transaction process has begun.

In some embodiments, the invocation of the initiate payment transaction function may cause a switch 109 in the call handler to be opened. This switch 109 logically controls the audio to the agent. When open, the audio to the agent is interrupted. Thus, when switch 109 is open, the agent cannot hear any audio of the call and when closed, the agent can hear audio from the remote party and the BCPPS (if conferenced to the call). The actual implementation of this switching function may occur in various ways. Further, in some embodiments, when the audio to the agent is interrupted, the speech from the agent may be transmitted to the bridge 111 or the agent's speech may be interrupted as well. The opening of the switch may be performed by the call handler as part of processing the initiate payment process function, or the AABC-ASM may open the switch in response to being informed that the payment process has been initiated.

The invocation of the initiation payment process function may also result in bridging on the SAM to the call. The SAM is made aware of call leg connections that are established to it from the call handler and as described above, the event handler will receive in some manner, a call-related event notification indicating the call legs to the SAM are established. The event handler may also inform the AABC-ASM 165 that a new call now exists via link 155. Thus, the AABC-ASM now knows that the payment process has begun and expects to potentially receive speech-related event notifications for this call.

During the payment transaction process, the SAM 120 may detect various keywords that may be present on the two VoIP streams. As noted earlier, one VoIP stream conveys speech from the remote party and the other conveys the prompts from the BCPPS. Typically the SAM determines the end of the payment transaction by focusing on the prompts provided by the BCPPS. Upon detection of a particular keyword, the SAM 120 issues the appropriate speech-related event notification to the event handler module 150, which forwards these to the AABC-ASM. This includes information identifying the particular call, the party which uttered the keyword (e.g., the BCPPS or remote party), and the keyword detected. Other information may be included.

The AABC-ASM comprises the logic to then determine based on the BCPPS the status of the payment transaction, including if the payment transaction has ended. This is provided to the agent's computer on link 117. Once ended, the AABC-ASM causes the audio path to the agent to be restored by causing a command on link 111 to close switch 109 using link 112.

Determining when the payment transaction has ended requires logic to handle all the possible situations. For example, a user may have entered an incorrect account number, resulting in the BCPPS playing an error announcement, and prompting the user to try again. The user may decide to try again, or not. If the user does try again to enter information, the AABC-ASM should allow the payment transaction to continue. If the user decides not to proceed and desires to end the payment transaction, then the AABC-ASM should restore the audio connection to the agent. Thus, the AABC-ASM has to comprehend the various interactions that can exist so that an appropriate and correct determination is made. The agent should not be restored to the call during the middle of the payment transaction, because this may allow the agent to hear sensitive information.

In one embodiment, the AABC-ASM informs the agent of the status of the payment transaction during the transaction. Recall that the agent is not privy to the audio interaction and this means that the agent cannot ascertain whether the payment transaction is occurring as planned, or if problems are occurring. Rather than have the agent wait for 30-60 seconds or longer without receiving any feedback, the AABC-ASM may provide various forms of status indications to the agent via link 117, preferable via text and/or icons that are displayed on the agent's computer workstation indicating an appropriate status. In one embodiment, when the agent audio is restored, an appropriate visual indication is provided to the agent to inform them that they can now interact with the remote party. In another embodiment, a visual indication may indicate whether the payment was successfully received. This way, the agent knows the status of the transaction when there are restored to the call and are addressing the remote party.

In other embodiments, the AABC-ASM may cause an audible prompt to be provided to the agent, which is not provided to the conference call. This would provide feedback to the agent in cases where the agent is visually impaired. This mode of operation allows alternative means of providing feedback to the agent.

Once the AABC-ASM has determined the payment transaction is completed, it will notify the call handler via signaling 111 to close the switch 109, so that the agent is restored to the call and can now hear the audio from the remote party. This can be referred to herein as invoking an "end payment transaction" function The AABS-ASM may also provide signaling information 117 to the agent's computer indicating the status of the transaction as described above. Further, in one embodiment, the call leg 128 to the bank card payment processor may be dropped when the payment transaction is ended. This may be accomplished in various ways, including manually dropped by the agent, automatically dropped by the call handler, or upon separate command by the AABC-ASM to the call handler.

Secure Multi-Port Conference Bridge

The secure multi-port conference bridge ("SMPCB" or simply "bridge") may be in one embodiment, a four-port conference bridge that is configurable to selectively suppress audio to the agent, and potentially from the agent. Selectively suppressing audio to the agent includes suppressing audio originating both from either the remote party or the BCPPS. Because the bridge is able to selectively suppress the audio and hence protect sensitive information from being heard by the agent, it is referred to as a "secure" bridge, and is not a conventional bridge. A variety of technologies and architectures can be used to construct the SMPCB, including a combination of a switch and a four port conference bridge. In the embodiment disclosed herein, an architecture is provided that can be used for digitized packetized voice, such as VoIP.

The SMPCB can be constructed in a modular arrangement using two components: a splitter and a combiner. These can be constructed in a variety of ways, including hardware or a combination of hardware and software.

Figure 2A:
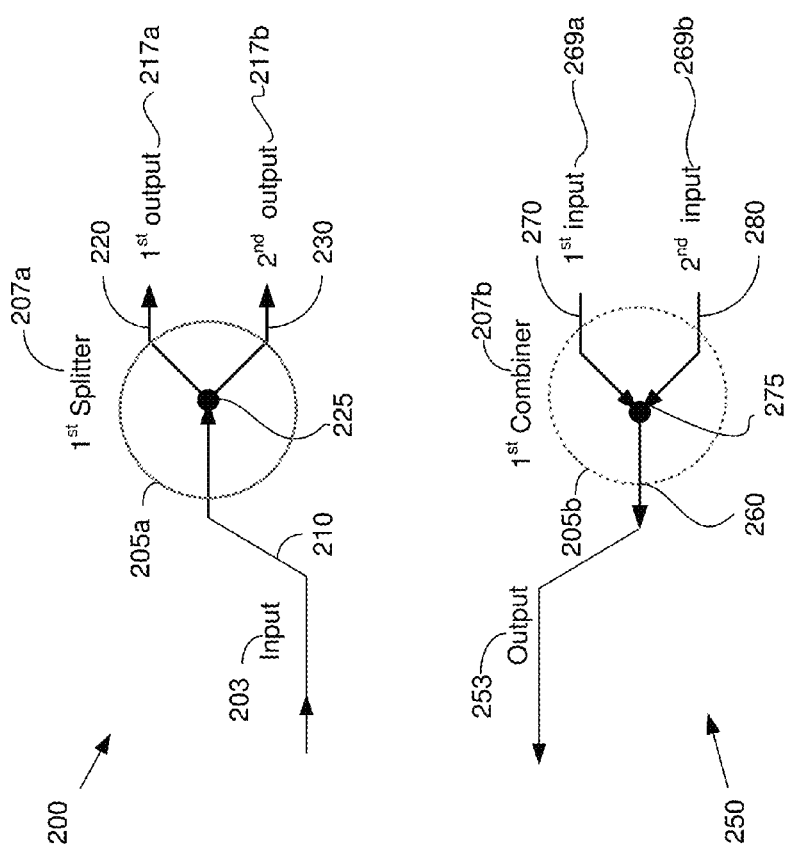
FIGS. 2A-2B illustrate an architecture of one embodiment focusing on the structure of the secure audio bridge used by the agent that is controlled by the speech analytics system.

The splitter functions to receive an input and copy the information onto two outputs. The combiner functions to receive two inputs and multiplex them on a single output. These components are represented in FIG. 2A. The combiner functions to multiplex the two streams so that they appear as one stream, connection, link (or whatever structure is being used).

The splitter 200 can be implemented in a variety of way, such as by using a router or a processor configured to perform a routing function which receives information and provides it to the appropriate outputs with the appropriate identifiers. This could also be implemented in hardware or a combination of hardware and software. Those skilled in the art will recognize that the splitter and combiner functions can be implemented in various ways.

The splitter receives information, typically representing voice or packetized voice samples at an input 210 that are then duplicated at a first output 220 and a second output 230. A node 225 represents the duplication processing. Since the splitter is a module which will be used to construct the SMPCB, the following convention is used to aid in understanding the more complex structures. First of all, a solid circle 205a is used to facilitate visually identifying the structure. An alpha-numeric label 207a of the name of the splitter is provided, along with labels 217a, 217b for referencing a first output and a second output. No priority is implied by the labels of "first" or "second"; the labels function to only distinguish and identify the two distinct outputs. A label 203 for the input may be shown, but because a splitter has only one input, it typically is not labeled as such in the figures herein. Referencing the input of a particular splitter is sufficient to identify that point with particularity. Further, arrows may be included on the diagram to aid in showing the direction of the flow of information. A splitter may be referred to by the alpha-numeric label 207a (e.g., "first splitter" or "1 S") and a particular output may be identified as a "$1^{st}$ output" or a "$2^{nd}$ output" (alternately, "1st out" or "2nd out") 217a, 217b. This convention is sufficient to uniquely identify a particular leg into or out of a particular splitter.

The combiner 250 functions in the reverse, namely to receive two inputs and then multiplexed the inputs onto a single output. The output label 253 may not always be indicated, since there is only one output 260 on a combiner. A dotted circular line 205b further aids in visually identifying the splitter, and an alpha-numeric label 207b can be used to identify and distinguish the specific combiner, such as "Second Combiner" or "2 C". Since there are two inputs 270, 280, labels 269a, 269b can be used to distinguish the inputs (e.g., "$1^{st}$ input" or "$1^{st}$ in"). A node 275 represents the combining of information.

Figure 2B:
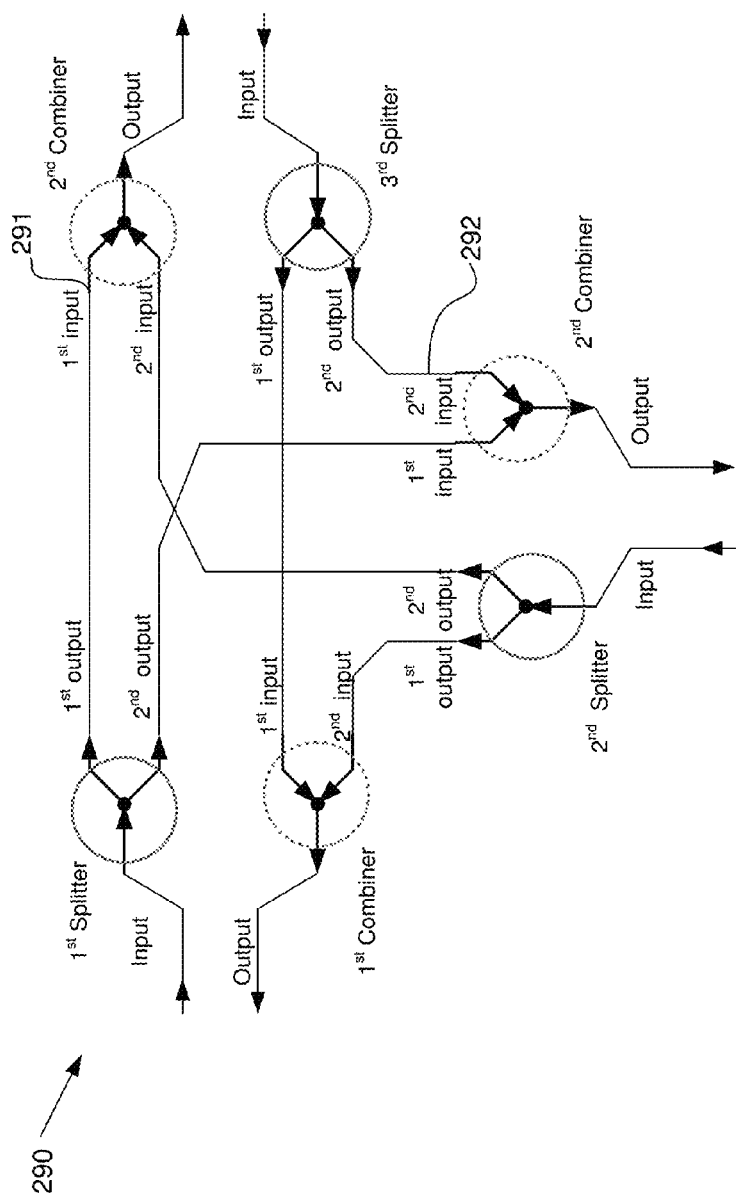

A SMPCB that is a four-port bridge can be made up from two three-port bridges. As shown in FIG. 2B, a three port bridge 290 can be constructed of splitters and combiners. Further information of the operation of this structure can be found in the aforementioned U.S. patent application, U.S. patent application Ser. No. 13/861,102.

To facilitate the explanation of the secure multi-port bridge operation, the nomenclature used herein involves referencing a component in the three-port bridge 290 by identifying a particular splitter or combiner, in conjunction with an indicator of "output" or "input." If the device has multiple inputs or outputs, then a particular "first" or "second" qualifier is used. Thus, the $1^{st}$ input to the $2^{nd}$ Combiner 291 is identified in FIG. 2B. This could also be represented as "$1^{st}$ input to $2^{nd}$ C". Similarly, the $2^{nd}$ input to the $2^{nd}$ combiner 292 is shown, which is connected to the $2^{nd}$ output of the $3^{rd}$ splitter.

Figure 3A:
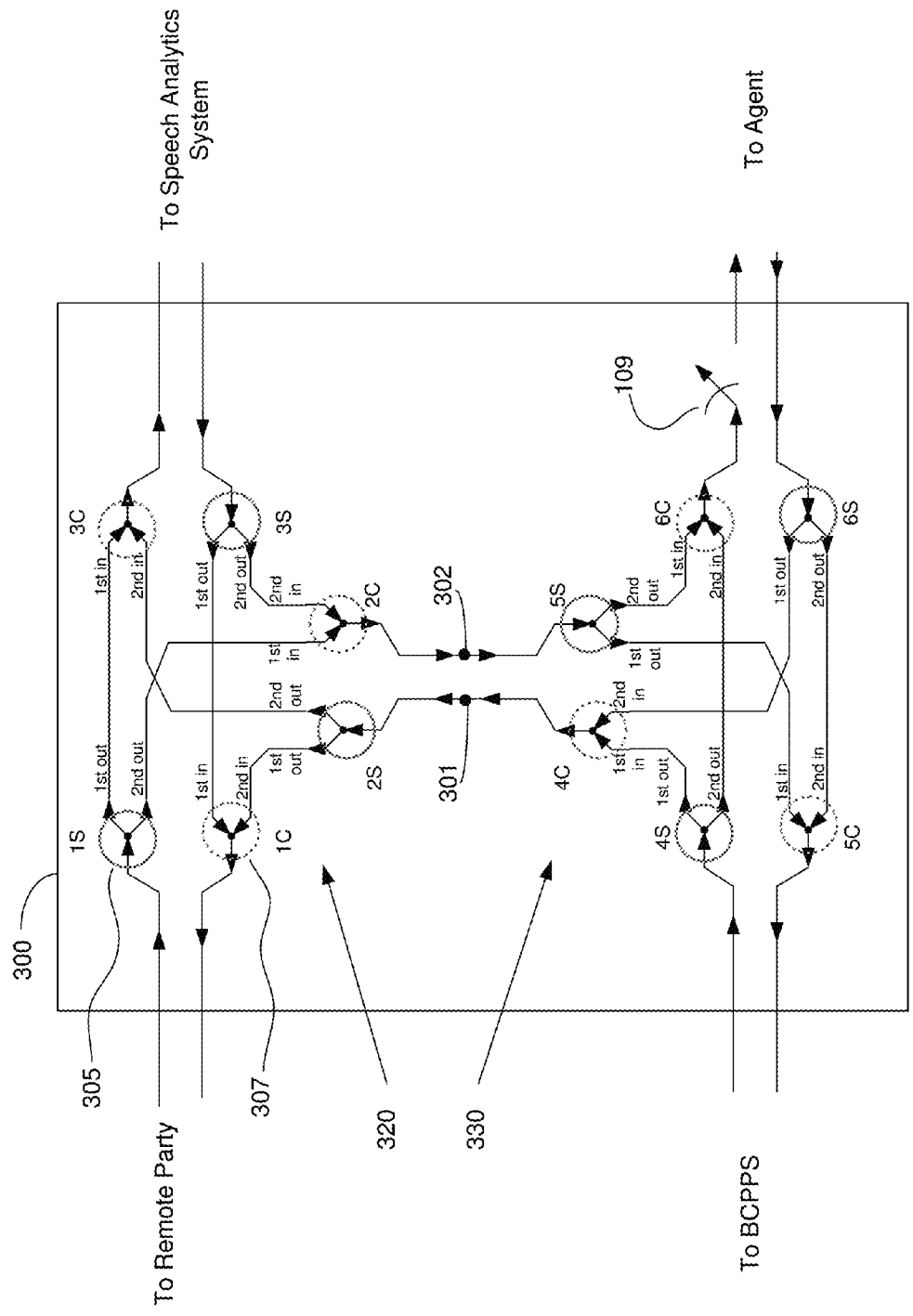
FIGS. 3A-3B illustrate a secure four-port audio bridge for conferencing between a remote party, a bank card payment processing system, a speech analytics system, and an agent.

If two three-port bridges are combined as shown in FIG. 3A, then a four-port bridge can be constructed. Turning to FIG. 3A, the four-port secure audio bridge 300 shown can be constructed from a first three-way bridge 320 connected to a second three-way bridge 330 at nodes 301 and 302. To facilitate illustration, the first splitter 305 is simply designed as "1S." Similarly, the first combiner 307 is simply designated as "1C". Further, the inputs and outputs are abbreviated as "in" and "out" with a numerical qualifier. Thus, it should be clear that the designation, for example, of "4S $1^{st}$ out" refers to the first output of the fourth splitter. Finally, the switch 109 is shown as interrupting the agent from receiving the output from the sixth combiner.

Figure 3B:
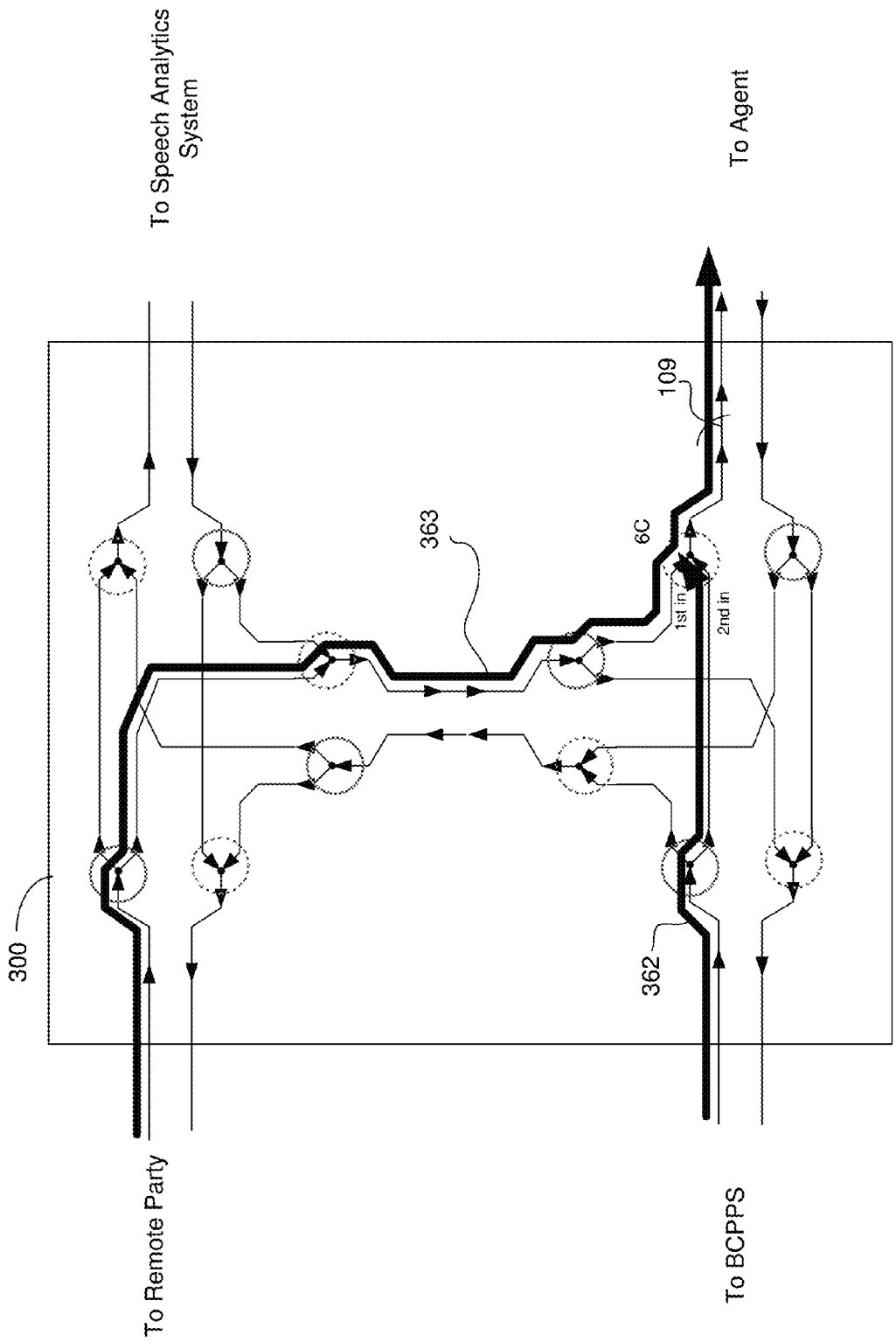

Turning to FIG. 3B, it is evident that tracing the flow of the secure audio bridge 300 results in the input to the bridge from any party being provided to each output port. In other words, audio from any party is provided to all other parties. This means that audio from the BCPPS is provided to the remote party, the speech analytics system, and to the agent (provided switch 109 is closed). For purposes of illustrating two exemplary flows of audio data, FIG. 3B shows, for example, a flow 362 from the BCPPS that is received at the $2^{nd}$ input of the sixth combiner, and provided switch 109 is closed as shown, this data is provided to the agent. Similarly, flow 363 from the remote party is also provided to the agent, presuming switch 109 is closed. Other flows occur, and those skilled in the art should be able to trace all the other flows.

Figure 4A:
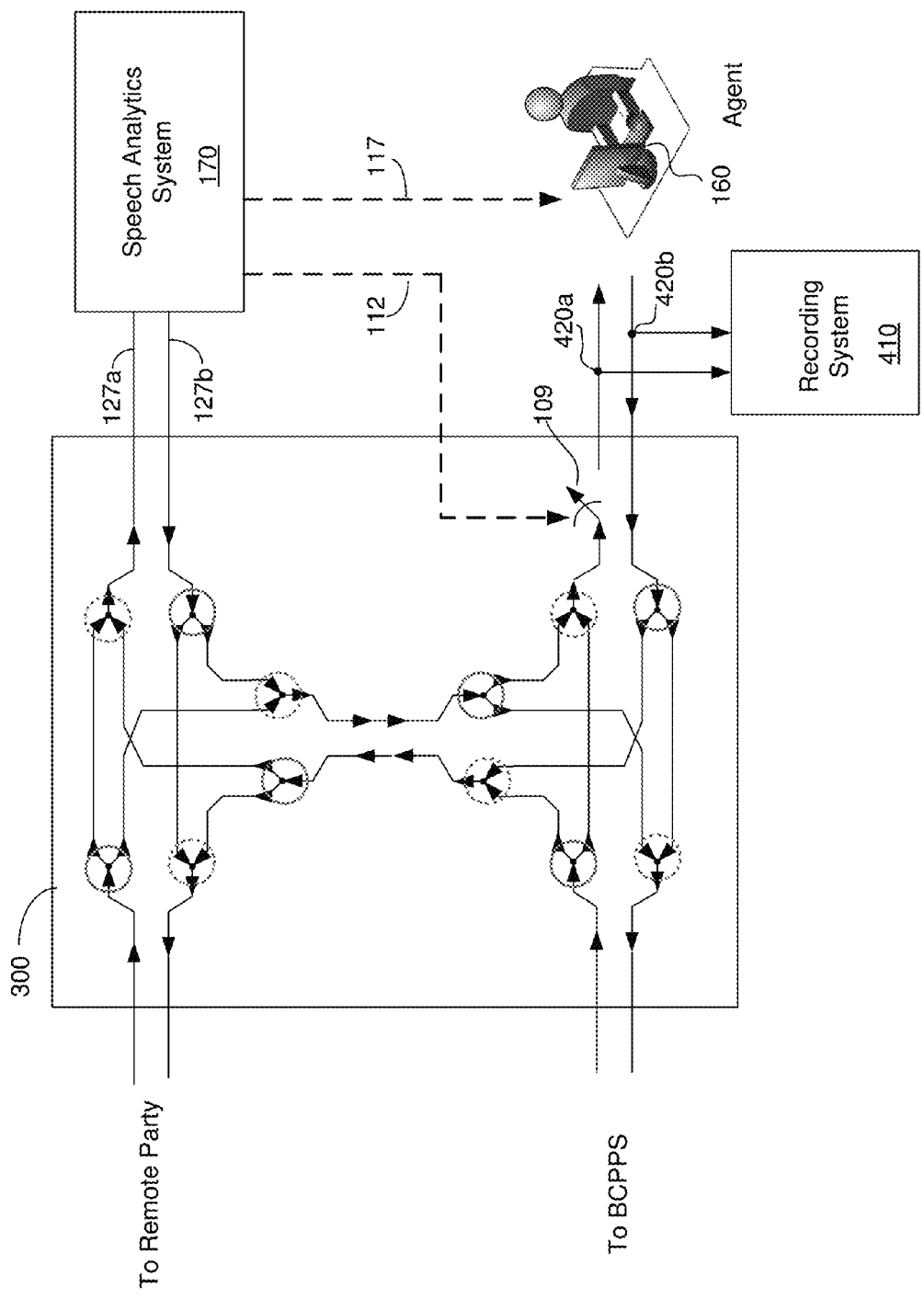
FIGS. 4A-4C illustrate various embodiments of secure multi-port audio bridges for use in a payment transaction consistent with the principles and technologies disclosed herein.

Turning to FIG. 4A, this figure shows the secure multi-port audio bridge 300 interfacing with the SAS 170 and the agent's workstation 160. Also shown are the signaling links 112 and 117 for the SAS to respectively control the switch 109 and provide status indications to the computer workstation 160. When the switch 109 is open, the agent does not hear any audio originating from the BCPPS, the remote party, or the SAS (to the extent the SAS would originate any audio). When the switch 109 is closed, then the agent does hear the audio originating from any of the other entities.

In the embodiment shown in FIG. 4A, the SAS 170 is shown as having two call legs 127a and 127b. In this embodiment, the first call leg 127a receives audio originating from any other of the three parties, and the second call leg 127b can be used for the SAS to interject announcements into the bridged call. In this embodiment, the SAS cannot readily distinguish the audio received from another party simply based on which call leg the audio is received on, since all audio at the SAS is received on a single call leg 127a.

Figure 4B:
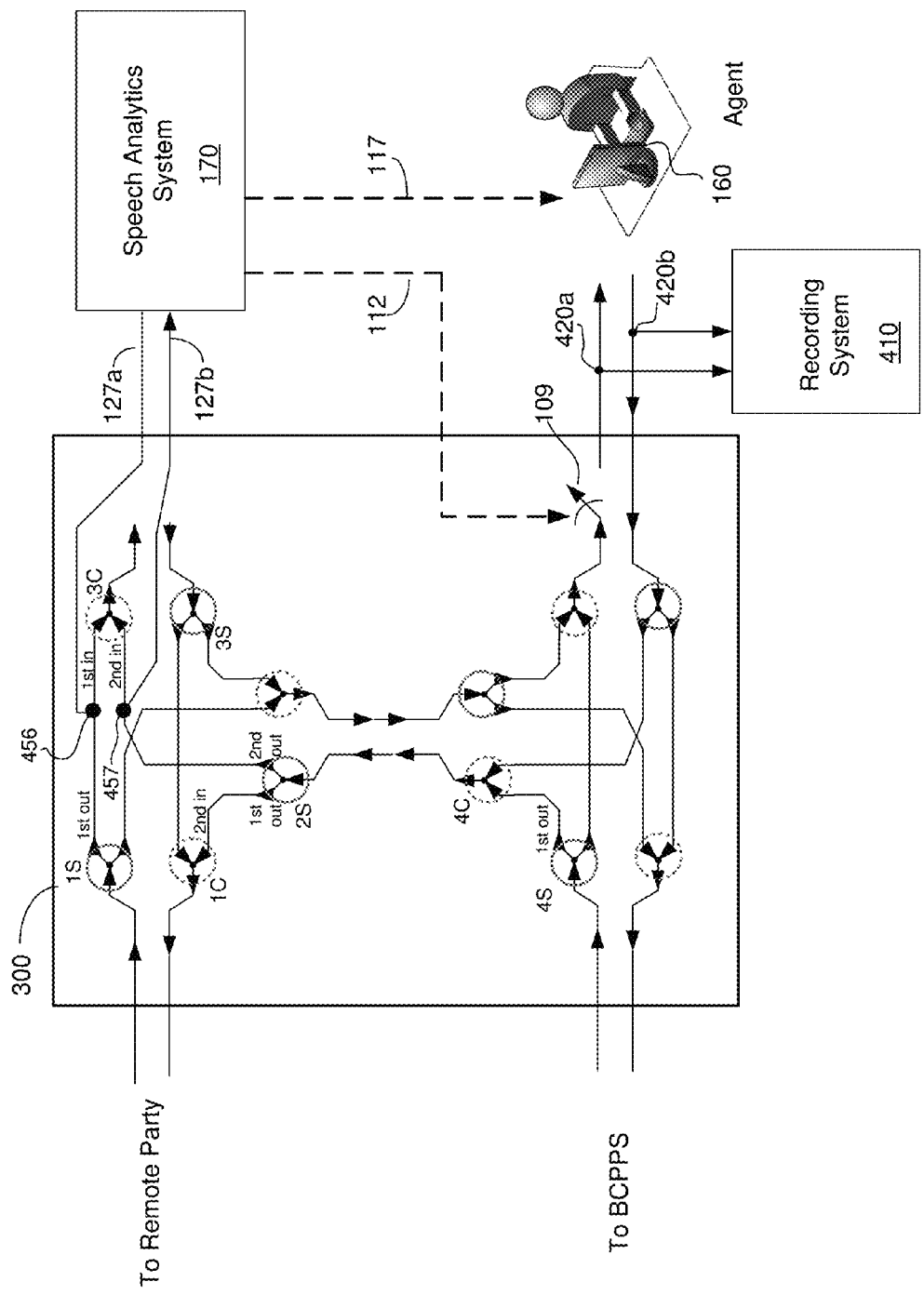

In another embodiment shown in FIG. 4B, the SAS 170 is connected to the multi-port audio bridge 300 in a slightly different manner as compared to FIG. 4A, but this configuration presumes that the SAS is not providing any announcements. Thus, in this embodiment various splitters/combiners are not required.

Further, FIG. 4B allows the SAS to distinguish between audio received from the remote party and the audio from the BCPPS/agent based on which call leg is it is received on. Recall that in FIG. 4A, the SAS received the output of the $3^{rd}$ combiner, which conveyed audio from all the other parties combined. In FIG. 4B, call leg 127a is tapped or bridged onto the first output of the first splitter, which is equivalent to the $1^{st}$ input of the third combiner, and is shown by node 456. This provides the SAS audio only from the remote party on call leg 127a. Furthermore, call leg 127b to the SAS does not convey audio from the SAS, which in many embodiments is not necessary, since the SAS may not be providing announcements. Rather, call leg 127b is tapped onto the $2^{nd}$ input of the third combiner, shown at node 457. This is also equivalent to the $2^{nd}$ output of the second splitter.

In essence, the third combiner functions to combine two inputs, which is audio from the remote party (on the first input) and the combined audio from the BCPPS and agent (on the second input). Thus, in this embodiment, the call legs are not connected to the output of the third combiner, nor the input to the third splitter. Rather, the call legs are connected to the input of the third combiner, which allows the SAS to easily identify the party the audio originated from.

FIG. 4B also depicts a recording system 410, which may be bridged onto nodes 420a, 420b, which represent audio heard by the agent (420a), and audio from the agent (420b). This can be done using a splitter at these notes, but which is not represented as such in FIG. 4B for simplicity. Since the opening of the switch 109 prevents the agent from hearing sensitive financial information at node 420a, opening of this switch also prevents the recording system 410 from recording sensitive financial information.

Furthermore, although FIG. 4B shows a single switch 109, it is possible to have a corresponding switch interrupting audio from the agent to the input of the sixth splitter (not shown). This could functionally be a double-pole-single-throw switch, so that both switches are activated/deactivated at the same time. This would prevent audio from the agent from being introduced into the conference call when the BCPPS is bridged onto the call.

Figure 4C:
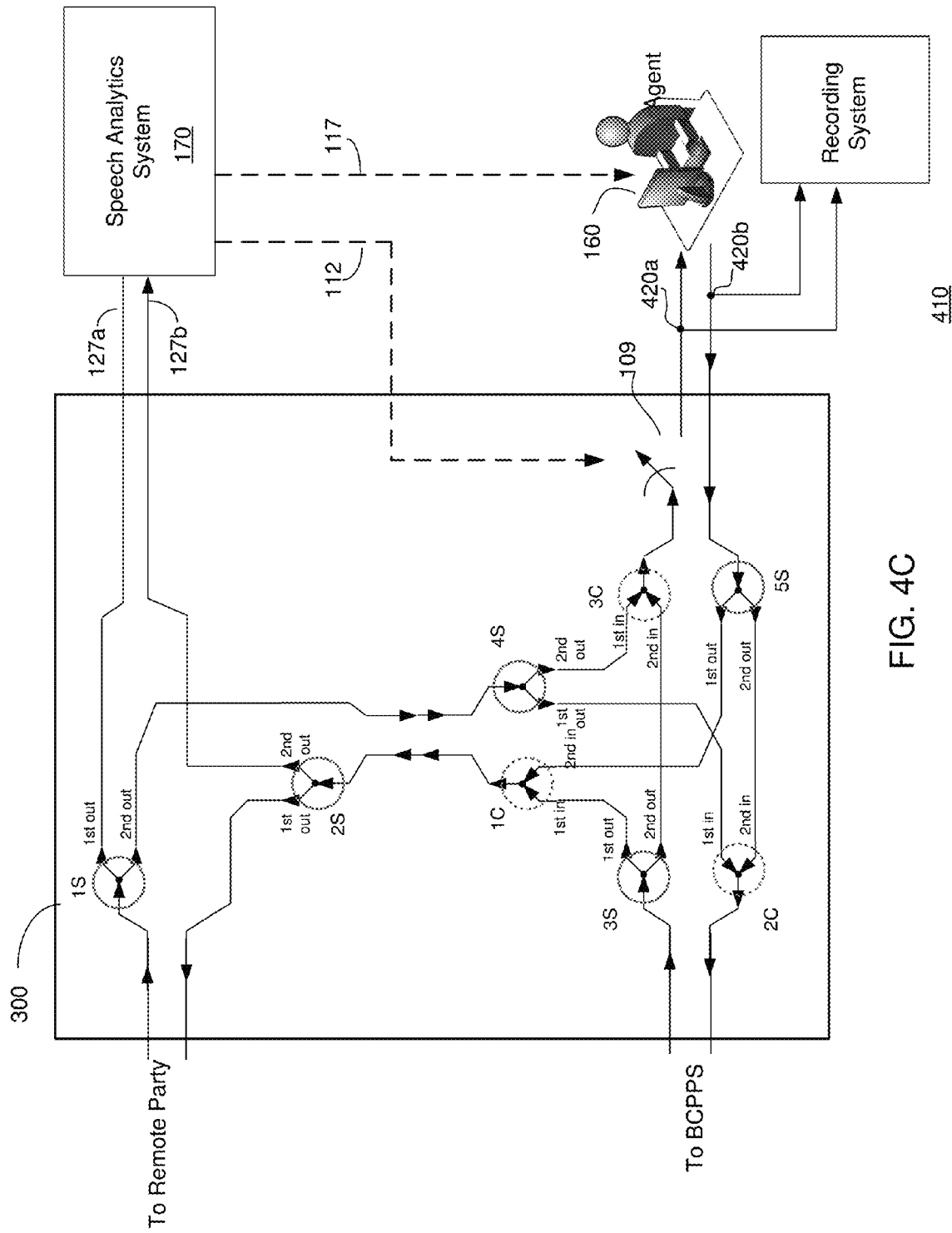

Returning to FIG. 4B, because the third combiner and the third splitter are not used, they can be eliminated in some embodiments. Further, neither the first nor the second combiner are required, and the resulting configuration shown in FIG. 4C can be used. It should be noted that in FIG. 4C, the numerical designation of the remaining splitters and combiners are renumbered, so that consecutive numbering is preserved (e.g., $1^{st}$ splitter, $2^{nd}$ splitter, $3^{rd}$ splitter, etc.). In this embodiment, there are only five splitters and three combiners. Thus, FIG. 4B illustrates one embodiments of a secure four-port audio bridge that can be used in practicing the concepts and principles herein for ensuring security of sensitive financial information during a payment transaction.

Service Overview

Figure 5:
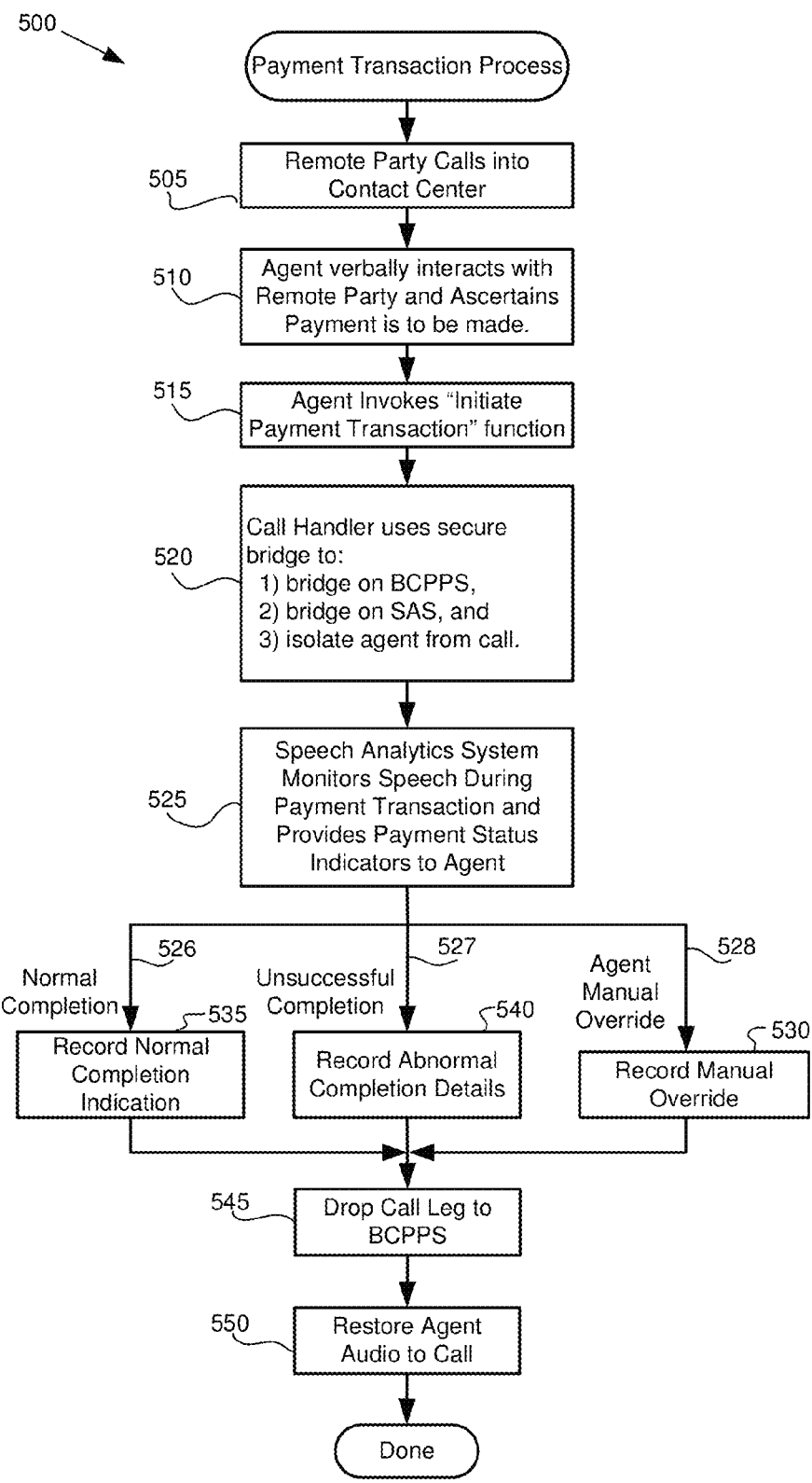
FIG. 5 illustrates one high level process flow associated with the controlling the secure audio bridge used by the agent.

A high level overview of the payment transaction process is shown in FIG. 5. There are various embodiments that are possible, depending on the desired extent of automated operation. The process 500 illustrates an operation based on an incoming call, but can apply to outgoing calls. The process begins with the remote party calling into the contact center in operation 505. There is a verbal interaction between the agent and the remote party, and during the course of the call the agent ascertains that the remote party is ready to make a bank card payment in operation 510.

The agent invokes an "initiate payment transaction" function, which may be based in the call handler or the AABC-ASM. This may be invoked via a function key, mouse click, or some other well-known means in operation 515. In response, the call handler causes the aforementioned secure multi-port audio bridge to be used as shown in operation 520, which includes: 1) bridging on the BCPPS, 2) bridging on the SAM, and 3) isolating the agent from the audio of the conferenced call.

The BCPPS may be externally located, i.e., it may be accessed by originating a call to a third party BCPPS using a communication network. The SAM may have been already automatically bridged onto the call, and if so, then this step is not required at this time. Finally, isolating the agent from the call may be similar to a "hold" function that interrupts audio to and from the agent, or this may only involve interrupting the agent from receiving audio.

At this point, the remote party is interacting with the BCPPS and the agent cannot hear their interaction. The SAS however is monitoring the interaction and may provide various status indicators to the agent in operation 525. These status indicators may indicate a particular phase of the payment transaction. For example, various icons or graphical indications can indicate the progress of the interaction. An icon may represent the steps completed or undertaken, a percentage of the process completed, errors encountered, an elapsed time, etc.

The payment transaction process may terminate in various ways. FIG. 5 shows an embodiment where there are three possible outcomes that may occur in response to the SAS monitoring the payment transaction. These are depicted by line flows 526, 527, and 528. In the normal use case associated with line 526, there is a normal completion of the transaction, leading to recording the normal completion of the transaction in operation 535. Typically, there is a prompt provided by the BCPPS indicating successful processing of the bank card. The SAS detects this prompt and generates a signal that restores the agent to the call and may also inform the agent of the successful completion. Data reflecting the normal completion of the transaction may be recorded in operation 535.

It is possible there may be an unsuccessful completion of the payment transaction as represented by line 527. In this case, the BCPPS may not have recognized the input from the remote party, or the BCPPS may not have been functioning properly. In some instances, the BCPPS may have simply declined the bank card. Any remote party interaction outcome which does not result in a successful transaction (and ends without an agent manual override) can be considered as an unsuccessful completion of the payment transaction. The SAS may also be configured to report this outcome to the agent. The SAS may then terminate the session by causing the BCPPS to be dropped from the call and restore the audio to the agent. In the case of an unsuccessful completion, any relevant required details are recorded in operation 540.

In some embodiments, the agent may be able to manually override the payment transaction as shown by line 528. For example, the SAS may provide an indication to the agent that the remote caller is having a problem and the agent may manually intervene. Or, the agent may observe via the status indicators that the remote party is unable to successfully complete entering bank card data.

In such instances, the agent may have the ability to terminate the payment processing transaction. This can be done by invoking a function via the agent's computer, which indicates that the payment transaction is interrupted. This command may be sent to the call handler, or to the AABC-ASM which then sends a command to the call handler. In other embodiments, the agent may be able to verbally issue a command. This requires that the audio from the agent be provided to the conference. The SAS can then recognize a defined phrase used by the agent, such as "I am sorry you are having a problem with the automated payment system." In response, the SAS can then invoke the procedures it would as if the transaction normally completed, which results in the agent audio being restored. However, the agent's phrase may barge in while the BCPPS is prompting the remote caller, and thus may not be readily understood.

The invocation of the agent manual override typically leads to dropping off the BCPPS from the call and restoring the agent audio. In some embodiments, an announcement may be provided to the remote party, such as "Please wait while the agent returns to the call." This may be provided by the SAS, or another system. The occurrence of the manual override and other relevant information may be recorded in operation 530, and reported to a supervisor. An agent having an excessive number of manual overrides may be symptomatic of a lack of agent training or a malfunction of the BCPPS.

In each of these three outcomes 526, 527, 528, the call leg to the BCPPS is dropped in operation 545. If the payment transaction completes normally, then dropping the BCPPS from the call is usually initiated by the BCPPS or the SAS. If the BCPPS terminates the call upon normal completion in path 526, then the call handler may be configured to restore agent audio and drop the SAS from the call when the call leg to the BCPPS terminates. If the BCPPS does not terminate the call upon normal completion of the payment transaction, then SAS may cause the BCPPS to be dropped off, restore the agent audio, and then drop itself from the call. Similarly, in the case of an unsuccessful completion in path 527, the call leg to the BCPPS can be dropped automatically or manually similar to the normal completion case. In the case of the agent manual override, this may automatically result in dropping the call leg to the BCPPS. This manual override is, in effect, a cancellation of the payment transaction. Typically, this is invoked when an error condition or some sort occurs.

Regardless of how the payment transaction ended (e.g., via path 526, 527, or 528), once the call leg to the BCPPS is dropped in operation 545, the audio to the agent is restored in operation 550, so that the agent can hear the remote party. These steps may occur contemporaneously or in reverse order. This completes the overall process.

In some embodiments it is possible for the SAS to detect when a payment transaction is to begin. This requires the SAS to be monitoring the call from the beginning. The SAS can detect the agent inquiring, e.g., "Would you like to make a payment using a credit card?" and further detect an affirmative response from the remote party. Then, the SAS could initiate the function automatically. However, this function may be manually invoked by the agent as described above, which can conserve the SAS resources.

Process Flows for Event Notifications

Figure 6:
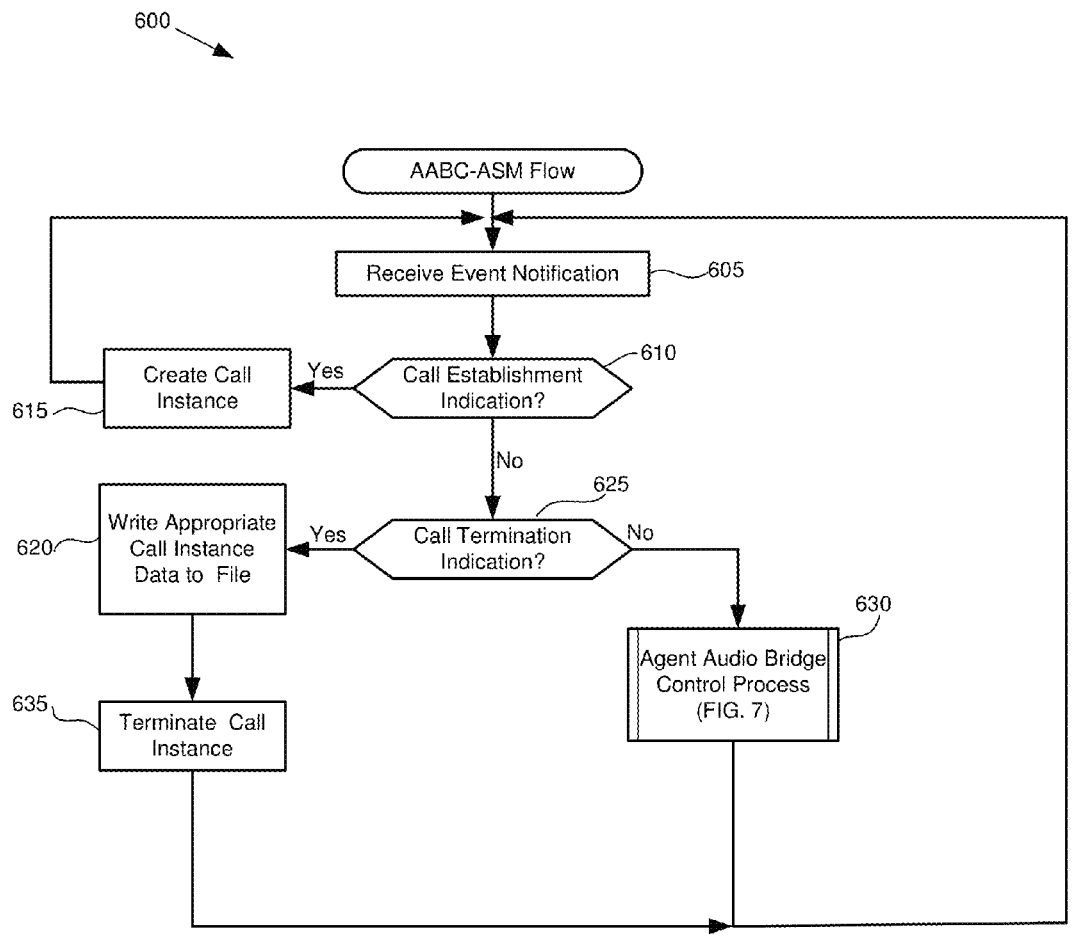
FIG. 6 illustrates one process flow associated with the secure audio bridge controller.

The AABC-ASM process flow describes how event notifications are processed to realize the secure audio bridge control described above. The logic defined in the AABC-ASM operates on each call independently from other calls. The processing in the AABC-ASM involves processing both call-related event notifications and speech-related event notifications. The first process flow, shown in FIG. 6, represents the process flow for processing call-related event notifications in the AABC-ASM. Recall that these event notifications inform the AABC-ASM of the establishment and termination of a call between the call handler and the SAS (specifically, the SAM), which occurs when the SAS is bridged onto the call between the agent and remote party.

Relative to processing the speech-related event notifications, the processing is relatively straightforward, as each ASM (including the AABC-ASM) typically creates a separate call instance for each call bridged to the SAM. The call instance is a data structure defined for the ASM maintaining data specific to a call. When establishment of a call is reported, these ASM specific data structures (e.g., the call instance) may be generated. In one embodiment, the call instance comprises the information allowing identification of the call and includes identifiers associated with the various VoIP streams, to allow identification of which party is associated with which VoIP stream. Other information, such as the time the data structure was created may be included. The call instance may then be modified or referenced when subsequent speech-related event notifications are received for that call. Then, when the call is reported as terminated via a subsequent call-related event notification, the call instance (or selected portions thereof) may be saved, processed, and/or erased as appropriate.

Turning to the process flow 600 of FIG. 6, the process begins with receiving the event notification in operation 605. A test in operation 610 determines whether the event notification indicates a call establishment. Reference to a "call establishment" refers to creating call legs from the call handler to the SAM. Creating a call leg may reflect, for example, allocating a new identifier for a logical voice packet stream or establishing a virtual circuit of some form.

If the event notification received is a call-related event notification indicating establishment of a call leg, then the process proceeds to operation 615 where a call instance is created in the ASM. This call instance is associated with the call that was just reported as being generated. This can be accomplished by using a reference identifier, call number, or some other similar form of call identifier. The creation of the call instance results in generating and initializing a data structure stored in the memory of the AABC-ASM, and may further include the audio stream identifiers of the agent (which would also identify the BCPPS) or remote party. The call instance data structure is defined by the AABC-ASM and is typically unique relative to other call instance data structures generated by other ASMs.

If the event notification is not a call-related event notification indicating call establishment in operation 610, then the next test is to determine whether the event notification is a call-related event notification that reports the termination of the call in operation 625. If so, then the process continues to operation 620 where any appropriate data stored in the call instance is then saved (if desired) by writing it to a file (e.g., an agent compliance file). Saving the call instance data retains the desired information of the audio context to be reviewed later. In this application, information about a failed or prematurely terminated payment processing transaction may be recorded for diagnosing potential problems. This allows administrators to review potential problems or issues with the payment processing. After appropriate call instance data has been saved, the call instance data structure can be terminated in operation 635. The operation then returns to wait for the next event notification message in operation 605.

If the event notification is not a call-related event notification in operation 625, then the process flow continues from operation 625 to operation 630 that presumes the event notification is a speech-related event notification. Operation 630 reflects the processing of speech-related event notifications, which is shown in FIG. 7.

The call-related event notification process flow shown in FIG. 6 is somewhat generic for the different types of ASMs that can be defined in a SAS. Namely, call instances in any type of ASM are usually created in response to receiving a call-related event notification indicating call establishment. Then, any data generated during the call may be reflected in the call instance and saved when the call terminates. In many instances, there are no intervening speech-related event notifications received during the call, so there may not be any changes to the call instance for that call during the call. Thus, a call instance may be generated and erased, without any speech-related event notifications ever having been received. In the case of the AABC-ASM, this could reflect the possibility that a remote party was connected to the BCPPS, but then reneges on their decision to make a payment and never interacts with the BCPPS or hangs up.

Figure 7:
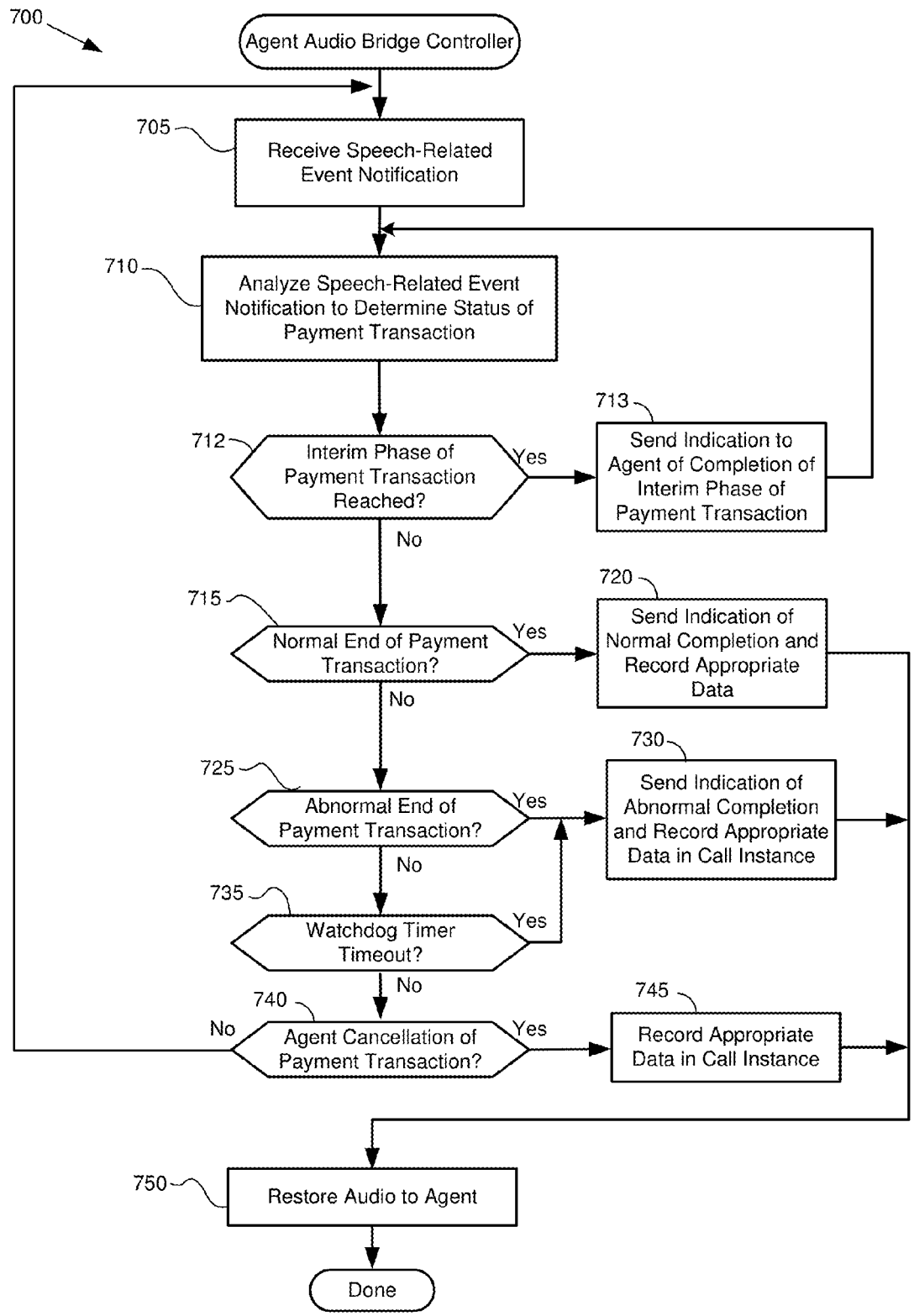
FIG. 7 illustrates one process flow associated with the agent audio bridge control application specific module.

The process flow for handling the speech-related event notifications, as shown in FIG. 7, however, is largely dependent on the particular application ASM is designed to handle. Turning to FIG. 7, the agent audio bridge control process flow 700 is shown. This is but one embodiment of the flow for controlling an agent audio bridge during a payment transaction, and a number of variations can be defined. Some of the capabilities shown in FIG. 7 are included to highlight some of the capabilities and functions that may be performed by an AABC-ASM, and not all embodiments of an AABC-ASM will include the functionality disclosed, and may include more or less functionality.

Recall that operation of the speech-related event notification processing occurs only after a call leg to the SAM has been established. Consequently, the speech-related event notifications are provided to the AABC-ASM with information at least identifying the relevant call, the keyword detected on that call leg, and potentially other information, such as the whether the agent or remote party provided the information.

This process flow 700 presumes that the agent initiates the payment transaction by invoking an appropriate function in the call handler that bridges the SAM onto the call. Thus, when the call leg is established to the SAM, the SAM generates an appropriate call-related event notification to the event handler, which forwards it to the ASM that in turn creates a call instance. At this point, the process 700 in the AABC-ASM is ready to receive a speech-related event notification, which is shown as being received in operation 705.

Next, the speech-related event notification is analyzed in operation 710 for the purpose of ascertaining the keyword and the corresponding status of the payment transaction and providing a suitable visual indication to the agent. If an interim phase is determined in operation 712, then this may result in an indication sent to the agent's terminal in operation 713. More will be said about these aspects later as there are a number of possible approaches to ascertain the status based on the keyword reported.

Next, the process determines whether the speech-related event notification signifies the normal ending of the payment transaction in operation 715. For example, this may be deduced if the speech-related event notification indicates that the BCPPS uttered the phrase "Your payment has been processed" followed by "Thank you." If the payment transaction has successfully ended, then a status indication of normal completion may be sent to the agent and the call instance data is updated in operation 720. Next, the agent audio is restored in operation 750, which may be accomplished by sending a signal from the AABC-ASM to control the secure multi-port bridge 111. In other embodiments, operation 750 may also include automatically dropping off the BCPPS from the bridge. In some embodiments, the BCPPS may be configured to self disconnect upon payment completion, the agent may do this manually, or the AABC-ASM may initiate the drop off.

If the speech-related event notification in operation 715 does not signify the normal end of a payment transaction, it may signify an abnormal end of the payment transaction. This maybe deduced, for example, if the speech-related event notification reports the phrase "Sorry, we cannot process your payment." If an abnormal end of the payment transaction occurs in operation 725, then an appropriate status indication is provided to the agent and the call instance data is updated appropriately in operation 730. Again, the process continues to operation 750 to restore the agent audio (and drop the BCPPS if appropriate).

If the speech-related event notification in operation 725 does not signify the abnormal end of a payment transaction, then a watchdog timer may be checked in operation 735. The watchdog timer may limit the duration of the payment transaction. For example, the BCPPS may be configured to allow the user to re-enter an invalid number an indefinite number of times. However, if after 120 seconds the user is unsuccessful, then the watchdog timer terminate the payment process in operation 730. In other embodiments, the watchdog timer may send a status indication to the agent, which in response can then invoke an agent manual override.

Finally, if the watchdog timer has not expired in operation 735, a determination is made whether the agent has invoked the manual override to cancel the transaction in operation 740. The manual override may be an optional capability in some embodiments, but incorporating this feature allows the agent to cancel the transaction manually in various circumstances which the AABC-ASM was not configured to detect. If invoked, then the call instance data is recorded in operation 745, and the process proceeds to operation 750. Otherwise, if there is no cancellation from the agent (and no expiry of the watchdog timer and no normal or abnormal end to the transaction), then the process loops back to operation 710 where the next speech-related event notification is received and processed.

Detecting Status of Payment Transaction

It was previously noted in conjunction with operation 710-713 that the speech-related event notifications are analyzed to ascertain the status of the payment transaction. In essence, the keywords reported in the event notifications are used to ascertain the status of the payment transaction. The details of how this occurs is highly dependent on the design of the service, the prompts used by the BCPPS, and the keywords the SAS is configured to detect and capabilities. The following examples illustrate the flexibility of possible embodiments along with the various design considerations.

In one embodiment, the AABC-ASM merely reports the end of a payment transaction without reporting any interim status indications. Assume that only one BCPPS is used, and the scripts that it uses are well known. The scripts may be defined so that at the end of a successful payment, the BCPPS announces to the party "Thank you, your payment has been received", after which the BCPPS remains silent, but still maintains the phone connection. The SAM may be configured to report, e.g., detection of the following keywords: "thank", "you", "payment", "received." The logic in the AABC-ASM would then ascertain the successful end of a payment transaction when the word "thank" is followed, by "you", then by "payment", and then by "received." In other embodiments, the SAM may report detection of "thank you" as a phrase, or the word "thank" followed within close temporal proximity to the word "you." Reporting a keyword is not limited to reporting detection of individual words, but may include phrases or certain words in proximity to other words. The SAM may also report the phrase "your payment has been received." In such case, the AABC-ASM logic may deduce the successful end of the payment transaction based on receiving a speech-related event notification indicating that the phrase "your payment has been received" was detected.

In certain contexts, merely detecting the phrase "thank you" or the word "thank" followed by "you" may be insufficient or necessary to conclude the transaction has been successfully completed. These words could be spoken prior to completion of the transaction. For example, the BCPPS may respond with a "thank you" for other steps that occur prior to the end of a transaction.

As expected, the logic in the AABC-ASM has to be coordinated with the scripts used by the BCPPS. For example, the logic in the BCPPS may be configured such that after indicating to the user that "your payment has been received", the BCPPS may prompt the remote party for initiating another transaction, such as checking a balance, etc. If so, the AABC-ASM should not presume that the payment transaction is completed. If the AABC-ASM reported the completion of the transaction after receiving the report of "your payment has been received" and restored the audio to the agent, the agent may then be unintentionally privy to sensitive financial information as the user selects and completes another transaction.

Similarly, when the BCPPS reports an error to the remote party, the BCPPS may provide an announcement to the remote party that includes the phrase "your payment was not received." It becomes obvious that merely triggering off the words "payment" and "received" would not be indicative of a successful completion of a transaction. The presence of the word "not" between "payment" and "received" alters the conclusion of the success of the payment transaction. As one skilled in the art would recognize, the design of the AABC-ASM logic must also be coordinated with the capabilities of the SAM, the vocabulary and scripts of the BCPPS, and all the possible outcomes that may occur. Thus, designing a successful AABC-ASM logic requires coordination between these elements. Depending on the capabilities of the SAM, the logic in the AABC-ASM may be different, and depending on the prompts used by the BCPPS, different AABC-ASM logic may be required.

The AABC-ASM may report the status of the payment transaction to the agent prior to the completion thereof. This reporting may be accomplished based on monitoring various keywords that are expected during the payment transaction. For example, when paying by a credit card, the BCPPS may prompt the user for the following information and in the following order: credit card type, account number, expiration date, and security code. The BCPPS may prompt the remote caller using phrases, such as "what type of credit card are you using?", "please enter the credit card number", "please enter the expiration date", "please enter the 3 digit security code."

The SAM maybe configured to detect such phrases, such as "type of credit card", "account number", "expiration date", "security code" and in this specific order Because the BCPPS announcements can be expected to be consistent for each payment transaction, the SAM may be specifically configured to detect these phrases. For example, a human may employ different phrases for similar functions, such as asking the caller for the "type of card", or "card type", or "type of credit card." However, the SAM may be configured to detect a single phrase that is always used by the BCPPS and therefore provide greater accuracy.

Thus, the AABC-ASM may detect these various phrases in speech-related event notifications and map these to a predefined status of the payment transaction. Returning to the example of processing a credit card, the AABC-ASM can be configured to expect that the process involves certain steps. Typically, the information collected involves indicating the type of card, indicating the card account information, confirming the entered information, indicating the amount to be charged, receiving confirmation to charge the amount, processing the charge, and confirming the outcome to the caller. This may include providing a confirmation number to the remote party. The AABC-ASM can be configured to rely on this specific process employed by the BCPPS to increase the accuracy of the AABC-ASM in detecting the payment transaction progress. Thus, the AABC-ASM can detect certain keywords during the payment transaction and map these to text or visual status indicators that are provided to and displayed by the agent's computer.

For example, the payment transaction process may be divided into phases, such as: collecting card information, confirming charge amount, receiving confirmation, processing the payment information, and reporting the result to remote party. A normal progression is to successfully migrate for one phase to the next in the defined order. The status indicators provided to the agent may visually indicate the progression a dialogue box or pop-up window, of which one embodiment is shown in FIG. 8A.

Figure 8A:
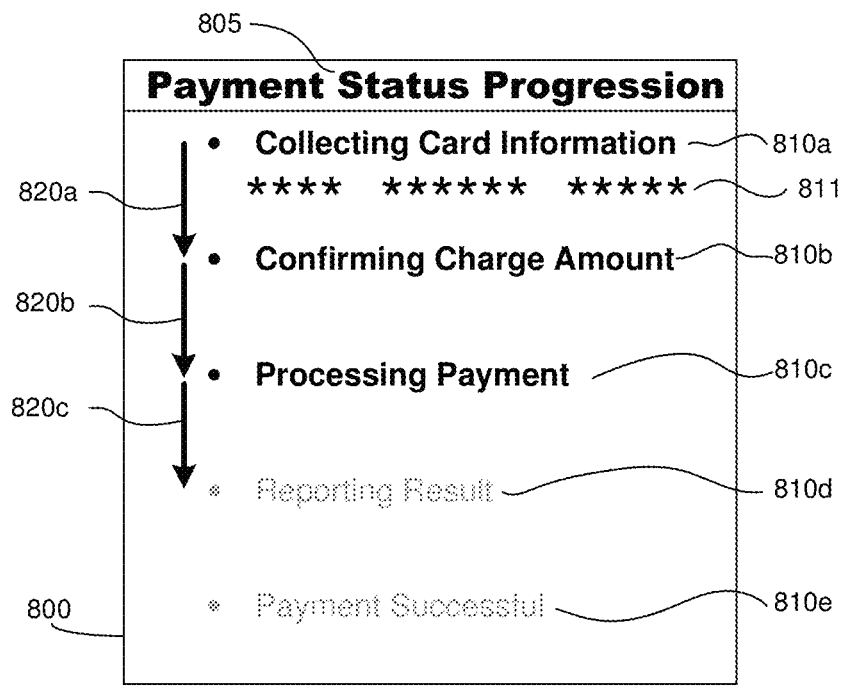
FIGS. 8A-8B illustrate various graphical user interface information that can be displayed to an agent indicating the status of a payment transaction.

Turning to FIG. 8A, the pop-up window 800 may be displayed on an agent's desk top computer. The pop-up window should appear after the BCPPS is successfully connected and the agent is interrupted from the call. A text heading 805 confirms the purpose of the pop-up window to the agent. Thus, the mere existence of the pop-up window can confirm to the agent that the BCPPS has successfully been bridged onto the call and the payment transaction process has started.

The pop-up window may have a series of text based status indicators 810*a*-810*e*. Each of these refers to a phase of the payment transaction process. In this embodiment, the first status text 810*a* indicates that information related to the type of card, account number, expiration date, and security code is being collected from the remote party. This text indicator maybe displayed using bold font or some other form to indicate that this phase is occurring or has occurred. A series of arrows 820*a*-820*c* may be further utilized to indicate the current location in the overall processing phase. In this example, the bold text for status indicator 810*a*, 810*b*, and 810*c* along with arrow 820*c* indicates the BCPPS is currently processing the payment information. Once the BCPPS has the result of the payment transaction, it will report the outcome to the remote party resulting in status indicator 810*d* being indicated in bold text to the agent. Finally, a last indicator 810*e* may indicate the result to the agent. The grayed-out text of status indicators 810*d* and 810*e* indicate that these phases have not yet occurred.

In some embodiments, the SAS can provide indications of receiving each digit of a credit card via a generic placemarker 811. These may appear after detection of each digit entered by the caller, and provides a further level of granularity to the agent to know the progression of the payment transaction. For example, if after the first four asterisks there is no further indication of information being received, it may be that the caller is having a problem. The agent can chose to manually override the transaction, if need be. In some embodiments, the last four digits of a bank card may actually be displayed to the agent. This allows the agent to know which of several credit cards the remote party is using.

Figure 8B:
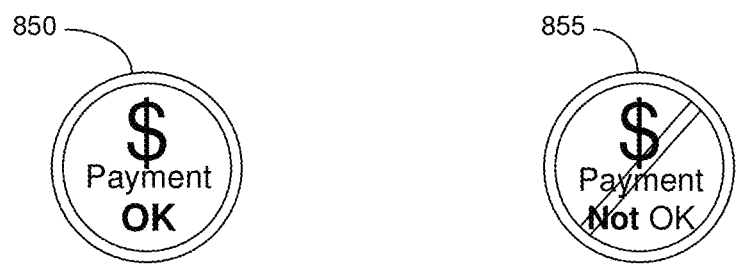

In other embodiments, an icon indicator may be presented to the agent in a preset location on the computer display regarding the status. These icons may be in a variety of forms, and FIG. 8B shows one embodiment that allows the agent to readily ascertain whether the payment transaction resulted in a payment or not. The first icon 850 could be used to reflect that the charge was successfully processed, whereas the second icon 860 could be used to reflect that the charge was unsuccessful. In either embodiments of FIG. 8A or 8B a variety of techniques known in the art could be used to highlight or indicate a status or payment result, such as using different colors, shapes, blinking rates, temporary appearance on the screen etc. In other embodiments, additional icons could be defined to indicate more granular stages of the payment transaction.

Other Embodiments

A number of different embodiments are possible, which all utilize the SAS. Some of these were previously identified. In one embodiment, the SAS is utilized to only detect the end of the payment transaction process. In other embodiments, the SAS may be utilized to report out the status of the payment transaction in real time. In other embodiments, the SAS may even be utilized to detect when the payment transaction is to begin. This relieves the agent from having to invoke the "initiate payment transaction" function. This requires the SAS to be bridged onto the call from the beginning of the call involving the agent and remote party.

There are a variety of keywords that the SAM may detect to ascertain what state the payment transaction is, or the completion of the payment transaction. There are also a corresponding variety of ways that the AABC-ASM logic can ascertain the status and completion of the payment transaction based on the reported keywords. The AABC-ASM can provide various levels of reporting to the agent. In one embodiment, the AABC-ASM could detect each prompt from the PP-IVR and report out a very detailed status to the agent. In other embodiments, the AABC-ASM could merely report out the final status of the payment transaction. Furthermore, in addition to visual indications, the AABC-ASM could provide audible indications of the status to the agent. This allows visually impaired agents receive status information.

In one embodiments, the BCPPS supplements the prompts used with a specific tone. Thus, the completion of the payment transaction may be signaled by providing a tone or series of tones. This can be interpreted by SAS as signaling the payment transaction completion. In effect, BCPPS provides an audio signal in addition to prompts, and the SAS is configured to detect the audio signal, as opposed to speech prompts. The SAS could then be simplified by using tone decoders, as opposed to sophisticated speech analytics. However, the use of tones would also be heard by the remote caller, and be viewed as confusing.

The overall operation of this system can be augmented by providing pre-recorded announcements to the remote party at certain times. For example, an agent could direct the playing of an announcement prior to, or in conjunction with, invoking the "initiate payment process" function. The announcement could prepare the remote caller for what about is to occur, indicate that the agent cannot hear the sensitive information about to be provided by the remote party, and provide instructions for the remote caller to stay on the line once payment is completed, or if there is a problem during the payment process. This announcement could be recorded in the agent's own voice, so that the remote party believes this is provided live by the agent. This could be provided by the SAS prior to bridging on the BCPPS to the conference all. In another aspect, if there is determination by the AABC-ASM that there is an abnormal termination to the processing event, an announcement could be directed by the AABC-ASM to be played to the caller indicating that the agent will be reconnected to the call shortly.

It is also apparent that invoking the "initiation payment transaction" function, or the "end payment transaction" causes several events to occur. For the initiate payment transaction, this involves the coordinated steps of bridging in the BCPPS, bridging in the SAS, and suspending the agent from the call. For the end payment transaction, this involves dropping the BCPPS, dropping the SAS, and restoring the audio to the agent. These actions can be coordinated by the call handler, the SAS, or in combination with the agent. Further, these may occur simultaneously or in a various order. For example, invoking the initiation payment transaction function could cause the call handler to bridge on the BCPPS, and remove the agent from the call. However, the agent may then have to manually bridge on the SAS. In other embodiments, this could all be done by the call handler. When reversing the process, similar flexibility exists as to the sequence and control of these actions. For example, upon successful payment being received, the BCPPS may disconnect from the call, whereas in other embodiments, the AABC-ASM may instruct the call handler to disconnect the BCPPS.

A variety of bridging architectures may be used and other approaches for making the SFI audio unintelligent to the agent. These include approaches described in U.S. patent application Ser. No. 13/861,102, which may be adapted to accommodate four conference legs—one for the agent, one for the BCPPS, one for the remote party, and one for the SAS. Further, the switching function for selectively removing the audio can be based on the various embodiments disclosed in the above application. As noted earlier, the removal of audio to agent may involve interrupting the audio to the agent, or interrupting the audio to and from the agent. In other embodiments, other forms of bridges can be used, which are not necessarily optimized for VoIP.

In some embodiments, different BCPPS may be used for different types of bank cards or for other reasons. When invoking the "initiate payment transaction" function, the AABC-ASM may be informed as to which BCPPS is being used, since each BCPPS may have a different script or grammar used to process the payment transaction. This allows the AABC-ASM to match its logic to the particular BCPPS and prompts being used.

In some embodiments, the BCPPS may drop its call leg upon completing a payment transaction (either successfully or unsuccessfully). The SAS may not then detect when the payment transaction has ended. In such instances, the bridge may automatically restore audio to the agent. The bridge may automatically also drop the call leg to the SAS. Given that the SAS may also not detect the beginning of the payment transaction, it is possible in some embodiments that the SAS is only used for providing status indications to the agent during payment transactions. Further, given that different BCPPS may be used for different types of payment transaction, the bridge and SAS may be used in different ways described above in conjunction with use with different BCPPS.

The system could be used for other applications than providing a payment. For example, a caller security verification system could verify a caller by using speech biometrics content of spoken responses from the remote party. The above system could be used for a contact center to verify a caller's identify by bridging on a biometric security system and interrupting the agent from the call, so that the agent cannot replicate a recording of the caller, nor hear the sensitive password information revealed by the remote party in response to prompts. The security verification system could then report to the agent whether the caller's identity has been verified and restore the agent to the call.

Exemplary Hardware

Exemplary Computer Processing Device

Figure 9:
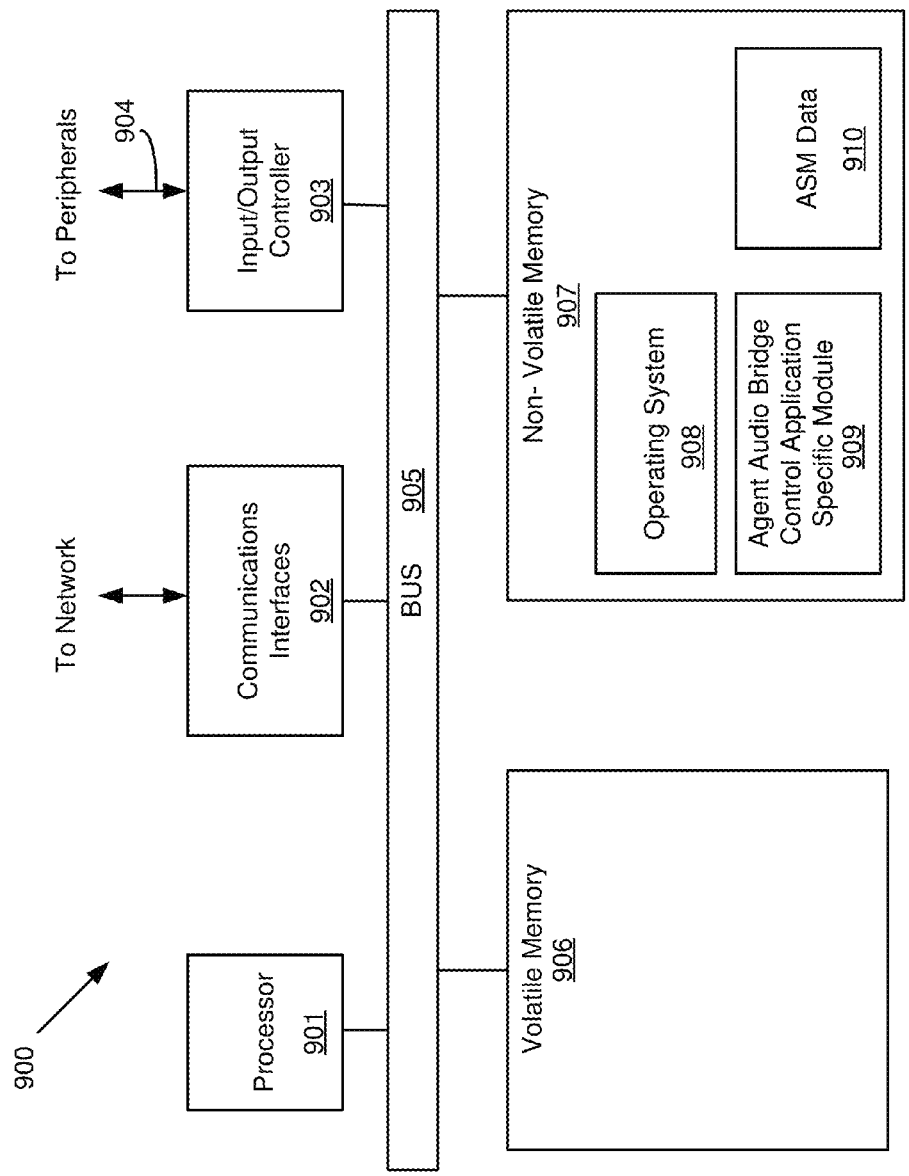
FIG. 9 illustrates an embodiment of a processing device for practicing various technologies and concepts disclosed herein.

FIG. 9 is an exemplary schematic diagram of a computer processing system that may be used in embodiments to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

The system 900 may apply to the system executing any of the above modules, including the speech analytics module 120, the event handler module 150, and/or the AABC-ASM module 165, although only the AABC-ASM module is shown in FIG. 9. FIG. 9 could also represent the system of the agent's computer, which displays the status indications to the agent. Further, although FIG. 9 shows only the AABC-ASM module, other modules may be present in the system of FIG. 9, either by integrating their functions into a single module or as separate modules in the system.

As shown in FIG. 9, the processing system 900 may include one or more processors 901 that may communicate with other elements within the processing system 900 via a bus 905. The processor 901 may be implemented as one or more complex programmable logic devices ("CPLD"), microprocessor, integrated circuit ("IC") based microprocessor, a von-Neumann architecture-based digital computer, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 900 may also include one or more communications interfaces 902 for communicating data via a data network, such as a local network, with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 903 may also communicate with one or more input devices or peripherals using an interface 904 such as, but not limited to: a keyboard, a mouse, a touch screen/display input, microphone, pointing device, etc. The input/output controller 903 may also communicate with output devices or peripherals, such as displays, printers, speakers, headsets, banner displays, etc. These may be used, in part, to receive administrator input, such as for configuring the system's operation.

The processor 901 may be configured to execute instructions stored in volatile memory 906, non-volatile memory 907, or other forms of computer readable storage media accessible to the processor 901. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 907 may store various program code modules and data, which also may be loaded into the volatile memory 906 at execution time (though not shown as such in FIG. 9). For example, the non-volatile memory 907 may store one or more modules, such as the AABC-ASM module 909 that may implement and perform the above-mentioned process flows containing instructions for performing the process and/or functions associated with the technologies disclosed herein, as well as operating system code 908. The AABC-ASM module 909 may also manage data such as the call instance data in the ASM data 910 which may be recorded for in various calls. The data and/or modules in the non-volatile memory may be copied in the volatile memory 906 at run time. The volatile memory 906 and/or non-volatile memory 907 may be used to store other information including, but not limited to: records, applications, programs, scripts, source code, object code, byte code, compiled code, interpreted code, machine code, executable instructions, or the like. These may be executed or processed by, for example, the processor 901 and may form a part of, or may interact with, the AABC-ASM module 909.

The technologies described herein may be implemented in various ways, including as computer program products comprising memory storing instructions causing a processor to perform the operations associated with the above technologies. The computer program product may comprise a non-transitory, tangible computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). The computer readable storage media includes all the above tangible identified computer readable media (including volatile and non-volatile media), but does not encompass a transitory, propagating signal, photon-based storage media, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

The examples for illustrating the concepts and the technologies herein have focused on agents in a contact center, but could be easily applied to other types of applications. Further, those skilled in the art will recognize that in light of this disclosure, many alternative embodiments and applications could be designed taking into account the concepts and technologies disclosed herein.

The invention claimed is:

1. A system for facilitating a remote party communicating sensitive financial information through a contact center without an agent of the contact center hearing the sensitive financial information, comprising:
   a call handler configured for engaging the remote party with the agent in a voice call, the call handler further comprising a first processor configured to:
      cause a first call leg to a bank card payment processing system ("BCPPS") to be bridged onto the voice call, the first call leg conveying sensitive financial information in audio form from the remote party,
      cause a second call leg to a speech analytics module ("SAM") to be bridged onto the voice call, whereby the SAM is able to receive audio information from the BCPPS,
      cause audio of the voice call to the agent to be interrupted, whereby the agent is unable to receive audio information conveying the sensitive financial information from the remote party, and
      cause the audio of the voice call to the agent to be restored in response to receiving a message from an application specific module ("ASM") indicating the BCPPS has processed the sensitive financial information conveyed from the remote party; and the ASM comprising a second processor configured to:
receive a speech-related event notification originating from the SAM indicating the BCPPS has processed the sensitive financial information, and
send the message to the first processor causing the audio of the voice call to the agent to be restored.

2. The system of claim 1, wherein the call handler comprises a bridge and the first processor is further configured to cause the bridge to interrupt the audio of the voice call to the agent in response to receiving the message from the ASM.

3. The system of claim 1, wherein the first processor is further configured to:
establish the voice call to the remote party comprising a first VoIP stream that conveys audio from the remote party and a second VoIP stream that conveys audio to the remote party.

4. The system of claim 1, wherein the first processor is further configured to:
receive a command originating from a computer used by the agent; and
in response to receiving the command, cause audio of the voice call to the agent to be interrupted.

5. The system of claim 4, wherein the first processor is further configured in response to receiving the command:
cause the second call leg to the SAM to be bridged onto the voice call.

6. The system of claim 1, wherein the speech-related event notification indicates that the payment was successfully processed by the BCPPS and the second processor is further configured to:
provide a status indication to a computer used by the agent indicating the payment was successfully processed by the BCPPS.

7. The system of claim 6, wherein the status indication comprises an icon displayed to the agent by the computer.

8. The system of claim 1, wherein the speech-related event notification originating from the SAM indicating the BCPPS has processed the sensitive financial information indicates the sensitive financial information was successfully processed.

9. A non-transitory computer readable medium comprising instructions that when executed by a processor cause the processor to:
interrupt audio on a voice call from a remote party and an agent, prior to the remote party conveying sensitive financial information to a bank card payment processing system ("BCPPS") connected to the voice call, whereby the agent cannot hear the remote party;
receive a call-related event notification from a speech analytics system ("SAS") processing audio from the BCPPS, wherein the call-related event notification reports the BCPPS indicating to the remote party completion of processing the sensitive financial information by the BCPPS;
display an icon on a display of a computer used by the agent, the icon indicating a payment was successfully processed by the BCPPS; and
restore the audio from the remote party on the voice call to the agent whereby the agent can hear the remote party.

10. The non-transitory computer readable medium of claim 9 further comprising instructions that when executed by the processor cause the processor to:
receive an input from the computer used by the agent requesting the audio on the voice call from the remote party to be interrupted.

11. The non-transitory computer readable medium of claim 9, wherein the instructions further cause the processor to:
cause the computer used by the agent to display one or more indications of completion of one or more phases associated with the payment made using the BCPPS prior to the completion of processing the sensitive financial information.

12. The non-transitory computer readable medium of claim 11, wherein the instructions further cause the processor to:
cause the computer to display the one or more indications of completion of the one or more phases after receiving one or more plurality of speech-related event notifications from the SAS.

13. The non-transitory computer readable medium of claim 9, wherein the instructions further cause the processor to:
receive an input from the computer used by the agent requesting the audio on the voice call from the remote party be restored.

14. A method for a contact center to facilitate a remote party communicating sensitive financial information through the contact center without an agent of the contact center hearing the sensitive financial information, comprising:
engaging the remote party in a voice call using a call handler with the agent, wherein
a bank card payment processing system ("BCPPS") is bridged onto the voice call for processing sensitive financial information provided by the remote party, and
a speech analytics system ("SAS") is bridged onto the voice call for processing audio from the BCPPS;
interrupting audio of the voice call to the agent prior to the remote party providing the sensitive financial information so that the sensitive financial information cannot be heard by the agent;
providing the sensitive financial information from the call handler to the BCPPS;
determining by the SAS when the sensitive financial information has been processed by the BCPPS by monitoring the audio from the BCPPS; and
in response to determining the payment has been processed, causing the audio of the voice call to be restored so that the agent can hear the audio of the remote party.

15. The method of claim 14, wherein interrupting the audio of the voice call to the agent further interrupts audio from the agent to the remote party, and wherein causing the audio to the agent of the voice call to be restored further causes the audio from the agent to the remote party to be restored.

16. The method of claim 15, further comprising the step of:
presenting an icon on a display of a computer used by the agent, wherein the icon indicates the sensitive financial information has been processed by the BCPPS.

17. The method of claim 16 further comprising:
presenting on the display of the computer an interim payment status indicator to the agent prior to presenting the icon.

18. The method of claim 14, wherein the SAS monitors an announcement from the BCPPS indicating that payment was successfully received.

19. The method of claim 18, further comprising:
sending a message from the SAS to the call handler to restore the audio of the voice call to the agent in response to determining the payment was successfully received.

20. The method of claim 14, wherein interrupting the audio of the voice call to the agent is initiated in response to the agent using a computer to signal to the call handler that the remote party is about to provide sensitive financial information.

* * * * *